United States Patent [19]
Yahav et al.

[11] Patent Number: 6,057,909
[45] Date of Patent: May 2, 2000

[54] OPTICAL RANGING CAMERA

[75] Inventors: Giora Yahav; Gavriel Iddan, both of Haifa, Israel

[73] Assignee: 3DV Systems Ltd., Yokneam, Israel

[21] Appl. No.: 08/981,357

[22] PCT Filed: Jun. 20, 1996

[86] PCT No.: PCT/IL96/00020

§ 371 Date: Dec. 19, 1997

§ 102(e) Date: Dec. 19, 1997

[87] PCT Pub. No.: WO97/01111

PCT Pub. Date: Jan. 9, 1997

[30] Foreign Application Priority Data

Jun. 22, 1995 [IL] Israel ........................... 114278
Dec. 1, 1995 [IL] Israel ........................... 116223

[51] Int. Cl.[7] ................ H01J 43/00; H04N 5/238; H04N 9/74; G06F 15/00
[52] U.S. Cl. ................ 356/5.04; 313/103 CM; 313/105 CM; 356/376; 356/378; 356/379; 348/367; 348/584; 702/156
[58] Field of Search ............... 313/105 CM; 356/376, 356/378, 379, 5.04, 5.03; 348/367, 584; 364/413.15; 702/156

[56] References Cited

U.S. PATENT DOCUMENTS

| | | |
|---|---|---|
| 3,571,493 | 3/1971 | Baker et al. |
| 3,629,796 | 12/1971 | Brownscombe et al. |
| 3,634,725 | 1/1972 | Biber . |
| 3,734,625 | 5/1973 | Aagard . |
| 4,143,263 | 3/1979 | Eichweber . |
| 4,408,263 | 10/1983 | Sternlicht . |
| 4,477,184 | 10/1984 | Endo . |
| 4,687,326 | 8/1987 | Corby, Jr. . |

(List continued on next page.)

FOREIGN PATENT DOCUMENTS

0465806 A2  1/1992  European Pat. Off. .

OTHER PUBLICATIONS

Intensified Lens System; Commercial Publication by Imco Electro–optics Ltd. Essex, U.K.
Anthes et al; Non–scanned LADAR imaging and applications; SPIE vol. 1936, pp11–22, (1993).
Burns et al; Compact, 625–Channel Scannerless imaging Laser Radar Receiver; SPIE vol. 2748, pp39–46.
Garcia et al; Characterization of a Scannerless LADAR System; SPIE vol. 1936, pp23–30; 1993.
Sackos et al; The emerging Versatility of Scannerless Range Imager; SPIE vol. 2748; pp47–60.
Hill et al; A Multi–Detecting Rangefinder Capable of Range Imaging; Applied Optics and Optoelectronics, University of York, Abstract Book pp 208–210; Sep. 1994.
Anthes et al; Non–scanned LADAR imaging and applications; SPIE vol. 1936, pp11–22, (1993).
Muguira et al; Scannerless Range Imaging with a Square Wave; SPIE vol. 2472, pp106–113; Conference date Apr. 1995.

(List continued on next page.)

Primary Examiner—Stephen C. Buczinski
Attorney, Agent, or Firm—Fenster & Company Patent Attorneys, Ltd.

[57] ABSTRACT

Apparatus for creating an image indicating distances to objects in a scene, comprising: a modulated source of radiation, having a first modulation function, which directs radiation toward a scene; a detector, which detects radiation reflected from the scene, modulated by a second modulation function, and generates, responsive to said detected modulated radiation, signals responsive to the distance to regions of the scene; a processor, which receives signals from the detector and forms an image, based on the signals, having an intensity value distribution indicative of the distance of objects from the apparatus; and a controller, which varies at least one of the first and second modulation functions, responsive to the intensity value distribution of the image formed by the processor.

78 Claims, 23 Drawing Sheets

U.S. PATENT DOCUMENTS

| | | |
|---|---|---|
| 4,734,733 | 3/1988 | Clapp et al. . |
| 4,734,735 | 3/1988 | Haneda . |
| 4,769,700 | 9/1988 | Pryor . |
| 4,780,732 | 10/1988 | Abramov . |
| 4,935,616 | 6/1990 | Scott . |
| 4,959,726 | 9/1990 | Miida et al. . |
| 4,971,413 | 11/1990 | Inoue . |
| 5,009,502 | 4/1991 | Shih et al. . |
| 5,056,914 | 10/1991 | Kollodge . |
| 5,081,530 | 1/1992 | Medina . |
| 5,090,803 | 2/1992 | Ames et al. . |
| 5,110,203 | 5/1992 | MacCabee . |
| 5,157,451 | 10/1992 | Taboada et al. . |
| 5,198,877 | 3/1993 | Schulz . |
| 5,200,793 | 4/1993 | Ulich et al. . |
| 5,200,931 | 4/1993 | Kosalos et al. . |
| 5,216,259 | 6/1993 | Stern et al. . |
| 5,220,164 | 6/1993 | Lieber et al. . |
| 5,225,882 | 7/1993 | Hosokawa et al. . |
| 5,243,553 | 9/1993 | Flockencier . |
| 5,253,033 | 10/1993 | Lipchak et al. . |
| 5,255,087 | 10/1993 | Nakamura et al. . |
| 5,265,327 | 11/1993 | Faris et al. . |
| 5,334,848 | 8/1994 | Grimm . |
| 5,343,391 | 8/1994 | Mushabac . |
| 5,351,677 | 10/1994 | Kami et al. . |
| 5,408,263 | 4/1995 | Kikuchi et al. . |
| 5,434,612 | 7/1995 | Nettleton et al. . |

OTHER PUBLICATIONS

Burns et al; Compact, 625–Channel Scannerless imaging Laser Radar Receiver; SPIE vol. 2748, pp39–46; Conference date Apr. 10, 1996; Abstract in 1995.

Garcia et al; Characterization of a Scannerless LADAR System; SPIE vol. 1936, pp23–30; 1993.

Sackos et al; The emerging Versatility of Scannerless Range Imager; SPIE vol. 2748; pp 47–60; Conference was in Apr. 1996.

Strand; Underwater Electro–optical System for Mine Identification; pp 6–238 thru 6–247; Proceedings of the Autonomous Vehicles in Mine Countermeasures Symposium; Apr. 1995.

Swartz; Diver and ROV Deployable Laser Range Gate Underwater Imaging Systems; Underwater Intervention '93 Conference Proceedings, pp 193–199; 1993.

Delong et al; Underwater Laser Imaging System; Proceedings of the Autonomous Vehicles in Mine Countermeasures Symposium, pp 6–103 thru 6–111 Apr. 1995.

Christie et al; Design and Development of a Multi–detecting Two–Dimensional Ranging Sensor; Measurement Science & Technology vol. 6 No. 9, pp 1301–1308; Sep. 1995.

Intensifield Lens System; Commercial Publication by Imco Electro–optics Ltd. Essex, U.K.

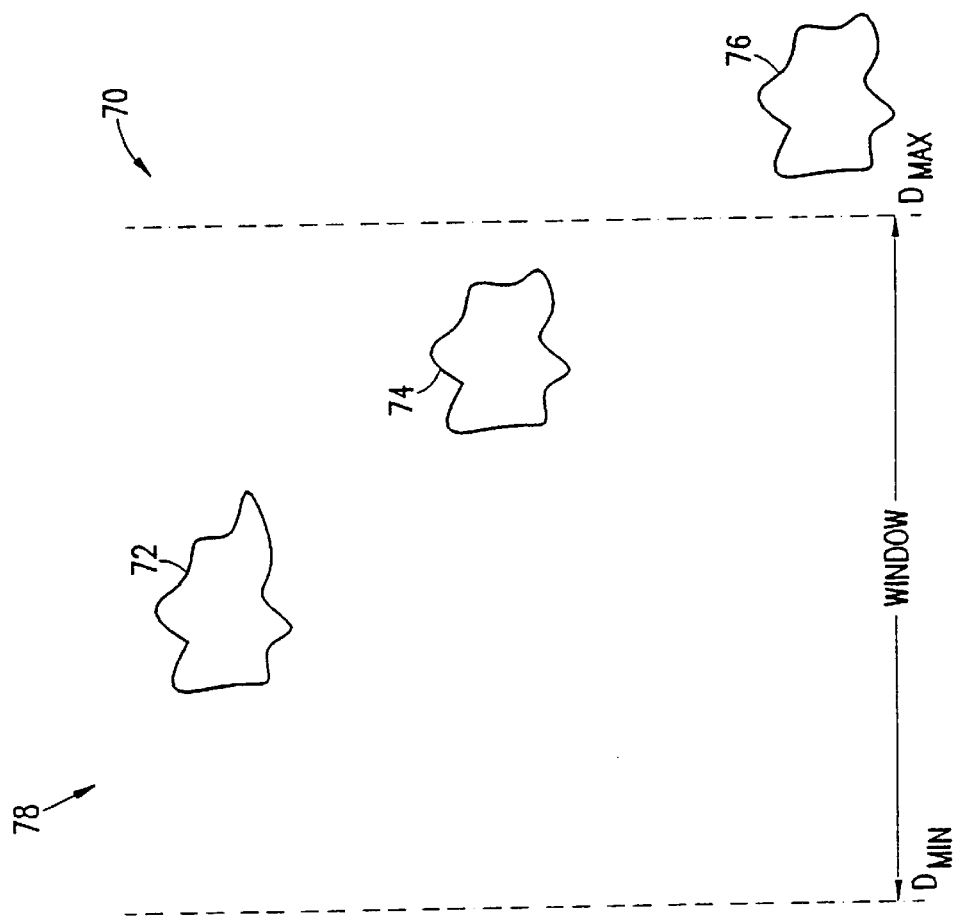
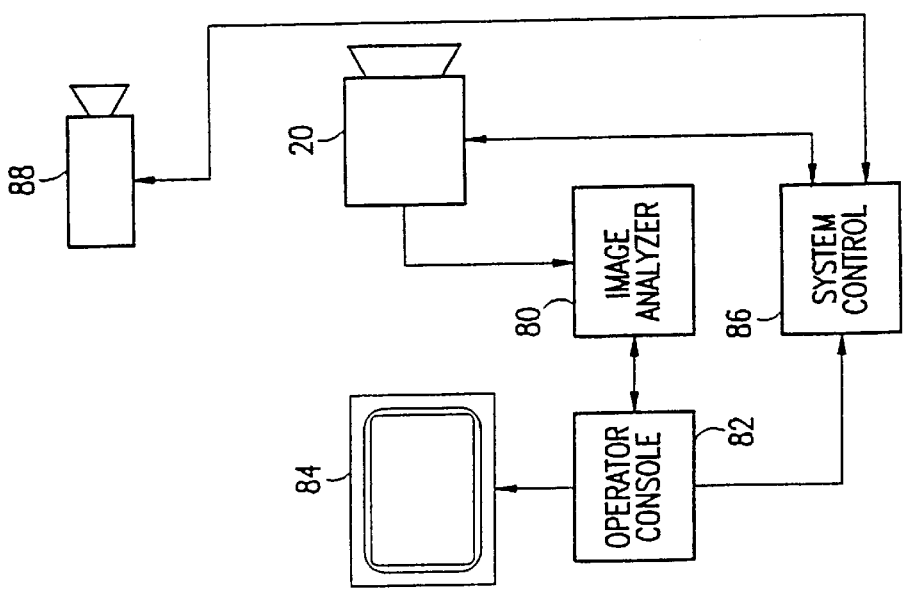
FIG. 7

OPTICAL RANGING CAMERA

FIELD OF THE INVENTION

The present invention relates generally to systems for producing three-dimensional images, and specifically to camera systems that capture an image of a scene and determine the distance to objects and portions of objects in the scene.

BACKGROUND OF THE INVENTION

Various techniques are known for creating three-dimensional images of a scene, i.e., images that include depth or distance information. Exemplary methods include time-of-flight, phase detection and triangulation. These techniques generally require that the image be scanned, for example by a laser beam, and depth data acquired point by point. It would be desirable in many applications, however, to acquire depth or distance information simultaneously over the entire image.

U.S. Pat. No. 5,200,793, which is incorporated herein by reference, describes a range-finding array camera, including a light source and a CCD or other detector array. An electro-optical modulator modulates both the illumination of the target scene by the light source and the light reflected back from the scene to the detector array, so that the illumination and the detected light have the same modulation pattern. As the modulation frequency is varied, a computer analyzes the intensity variation at each pixel of the array in order to determine the distance from the camera to the portion of the scene imaged by the pixel.

S. Christie, et al., in *Measurement Science and Technology* 6 (September, 1995), pages 1301–1308, which is incorporated herein by reference, describe a two-dimensional ranging sensor system. This system includes a laser, to illuminate the scene of interest, and a gated, intensified CCD camera, which acquires an image of the scene. The laser is modulated to provide an illumination pulse of a desired length, and the camera is gated to receive light from the scene for an equal length of time. The camera gating pulse may be simultaneous with the illumination pulse, or it may be delayed relative thereto. The integrated light intensity received at each pixel of the CCD array during the gating pulse is a function of the distance from the camera to the portion of the scene imaged by the pixel. A computer analyzes the light intensity thus received over the entire array and derives range information therefrom.

Range-gated cameras are similarly known in the art. Such camera generally include a gated detector array, working in conjunction with a pulsed or stroboscopic light source, which illuminates a scene. The array may be gated, for example, by coupling a gated intensifier thereto, such as the Intensified Lens System, manufactured by Imco Electro-optics Ltd., Essex, U.K., or by other means well known in the art. The gate timing of the detector array is delayed relative to the light source so that only objects within a desired range of distances from the camera are captured. The camera cannot determine the distances to various objects or different points within the range.

SUMMARY OF THE INVENTION

It is an object of the present invention to provide an improved ranging camera, which acquires depth information substantially simultaneously from all pixels in a scene.

In some aspects of the present invention, the ranging camera produces both an intensity image and a distance image of the scene, which images are mutually registered.

In one aspect of the present invention, the ranging camera produces a three-dimensional image of the scene.

In other aspects of the present invention, the ranging camera outputs information relating to the distance of one or more objects in the scene from the camera. This distance information may be used to filter and/or further process an image acquired by the camera, or as feedback to the camera itself, enabling it to adapt its distance-sensing function for greater selectivity and/or precision.

In preferred embodiments of the present invention, a ranging camera comprises a radiation source for illuminating a scene of interest and a detector array, preferably a CCD array, for detecting the intensity of radiation reflected from objects in the scene, as described in a first PCT patent application entitled "Optical Ranging Camera," filed on even date by the same applicants as the present application, which is assigned to the assignee of the present application and whose disclosure is incorporated herein by reference. The radiation source is modulated, for example by a mechanical or liquid crystal shutter, which alternately blocks and unblocks the source for predetermined, known periods of time. The reflected radiation is similarly modulated, so that radiation reaching the detector array is preferably blocked and unblocked for predetermined, known periods of time, which may be the same as or, more preferably, different from the periods of time for which the radiation source is blocked and unblocked. The intensity of the radiation reaching the detector array and detected thereby is then processed in order to determine distances from the camera of objects in the scene.

While in some preferred embodiments of the present invention, the radiation source and reflected radiation are modulated by one or more mechanical or liquid crystal shutters, as described above, other types of radiation modulators, known in the art, may similarly be used. Thus, in some preferred embodiments of the present invention, one or more electro-optical modulators, such as KDP crystal modulator, modulate the source and/or detected radiation. Additionally or alternatively, in some aspects of the present invention, the radiation source may be electronically modulated, by applying a suitable waveform to circuitry driving the source. Further additionally or alternatively, the reflected radiation may be modulated by reset/readout techniques known in the art, wherein the detector array is first reset, i.e., elements of the array are substantially cleared of electrical charges accumulated therein, and then after a known, predetermined delay period, charges that have accumulated in the elements are read out and measured.

The radiation source preferably comprises a laser, but may alternatively comprise suitable light sources of other types.

In some preferred embodiments of the present invention, the ranging camera comprises a telecentric optical system, as described in a second PCT patent application entitled "Telecentric Optical Ranging Camera," filed on even date by the present applicants, which is likewise assigned to the assignee of the present application and whose disclosure is incorporated herein by reference. Preferably, the reflected radiation is collected by suitable collecting optics, and modulated by an electro-optical modulator, such as a KDP crystal modulator. More preferably, the source radiation and reflected radiation are collimated along a common optical axis. In one such preferred embodiment, the source radiation and reflected radiation are modulated by a common electro-optical modulator, while in other preferred embodiments, they are separately modulated by different modulators.

In preferred embodiments of the present invention, the radiation source is modulated by a first waveform, and the reflected radiation in modulated by a second waveform. The shapes of the first and second waveforms and a time delay between the waveforms are adjusted to give a desired functional dependence of the intensity detected at each pixel of the detector array on the distance from the camera to the object imaged by the pixel.

Preferably, the first and second waveforms and the delay therebetween are adjusted so as to define a distance "window," i.e., a range of distances of objects from the camera over which the distances of the objects may be determined. While the radiation source and the reflected radiation are respectively modulated by the first and second waveforms, the camera acquires images only of objects inside the window. By suitably adjusting the window, the processing of the detected radiation to determine the distances from the camera to the objects within the window is simplified and/or its accuracy is improved. Preferably, the window is also adjusted to maximize the dynamic range of the camera for objects at a range of distances from the camera corresponding to a portion of the scene that is of interest.

In some preferred embodiments of the present invention, the first and second waveforms are such that the source and/or reflected radiation are blocked and unblocked many times during a single field or frame of the detector array. Preferably, the first and second waveforms comprise a plurality of pulses, wherein each pulse of the second waveform follows a corresponding pulse of the first waveform by a predetermined, typically constant, delay. Considering that the duration of a standard video field is about 16 msec, while the durations of the pulses of the first and second waveforms are typically less than one microsecond, it will be appreciated that hundreds or thousands of such pulses may be included in the time of a single field or frame. Such multiple-pulse modulation functions are useful in increasing the single/noise ratio of the image produced by the camera.

In some preferred embodiments of the present invention, the window is adjusted adaptively so as to acquire images of one or more objects of interest. Preferably, a first window, encompassing a large range of distances from the camera, is initially defined by modulating the source and the reflected radiation using waveforms of relatively long duration. An image of the objects of interest is acquired within this window, and the distance to at least one of the objects is determined. A second window is then defined, including the at least one object and preferably encompassing a narrower range of distances than the first window. In this way, a second image is acquired including reduced clutter of objects that are not of interest, and allowing more accurate determination of the distance to the at least one object of interest.

Preferably, the window is thereafter adjusted adaptively to track the at least one object of interest. As the distance of the object from the camera changes, the modulation waveforms are varied so that the object remains within the range of distances encompassed by the window.

Alternatively or additionally, the distance to an object of interest may be determined initially using a scouting beam, for example laser rangefinder or other types of rangefinders known in the art. The window is then adjusted so that the object is within the range of distances encompassed thereby.

In preferred embodiments of the present invention, images of portions of the scene that are located at distances from the camera outside the window are not acquired, or alternatively, are acquired separately from images of objects of interest in the scene. The present invention may then be used, for example, to distinguish the one or more objects of the interest from a more distant background. In some preferred embodiments, the images of the objects of interest are then combined with other images, for example, computer-processed or computer-generated images, using techniques known in the art, to form a desired mixed image.

In some preferred embodiments of the present invention, the detector array is a two-dimensional matrix array, for example a CCD array, and one or more light modulators modulate the reflected light reaching the array so that different modulation waveforms are respectively associated with different rows or groups of adjacent rows of the array. In this manner, different distance windows, i.e., different selected ranges of distances, are associated with different rows or groups of adjacent rows. Each such row or group of adjacent rows will produce a line image of the scene containing depth information regarding objects intersected by the line. In order to create an image of the entire scene, including depth information over a wide range, the field of view of the array is generally scanned over the scene, and multiple line images are acquired and combined, as will be described below.

In some of these preferred embodiments, a liquid crystal shutter array is positioned relative to the CCD array so as to separately modulate the reflected light reaching each row or sequential group of adjacent rows of the CCD array. Preferably, the liquid crystal array is driven so that successive rows or sequential groups of adjacent rows of the array are exposed to the reflected light for equal, successive periods of time. Thus, each successive row or group receives light from objects within a successive distance window in the scene, and is used to determine the distance of such objects from the camera.

More preferably, the liquid crystal array is driven so that a first row of the CCD array, adjacent to a first edge thereof, receives light from a first distance window, relatively close to the camera, and a last row of the CCD array, adjacent to a second edge thereof, opposite the first edge, receives light from a last distance window, relatively far from the camera. Each successive row of the array, between the first and the last rows, receives light from a successive distance window, all of which distance windows together substantially cover the distance between the first and last windows in successive, preferably substantially equal steps.

Alternatively, in other preferred embodiments of the present invention, a liquid crystal shutter array is suitably positioned relative to the CCD array and operated so as to separately modulate the reflected light reaching each pixel or group of adjacent pixels in the CCD array, so that each pixel or group of pixels has its own distance window associated therewith. The shutter array may preferably be operated adaptively, so that each distance window tracks the distance to a point on an object of interest in the scene whose image is captured by the respective pixel or group of pixels. Thus, the distance window associated with each of the pixels or groups of pixels may be adjusted to contain and to yield accurate readings of the distance to the point, as well as reducing image clutter.

In some of these preferred embodiments, in which each pixel has its own distance window, groups of mutually adjacent pixels are organized to operate cooperatively as "super-pixels." Each such super-pixel may include, for example, a three-by-three group of nine pixels, onto which light reflected from the scene substantially along a common axis is imaged. The shutter array is operated so that each of the nine pixels receives light from a different distance window along the common axis. In this manner, a complete image of the scene is captured, including depth information with a desired degree of distance resolution, although at the expense of lateral resolution. Super-pixels of any desired size, for example 1×2 pixels, 2×2 pixels or 4×4 pixels, may be used to achieve an optimal trade-off of distance versus lateral resolution.

It will be appreciated that although the above embodiments have been desired with reference to a liquid crystal shutter array, in other preferred embodiments of the present invention, other types of light modulator arrays may be used to similar purpose, for example gated, addressable micro-channel arrays, or arrays of electro-optical or acousto-optical light modulators.

In some preferred embodiments of the present invention, in which different distance windows are sequentially associated with different rows of a detector array, each of which rows forms a line image of a portion of the scene, as described above, the field of view of the array is scanned across the scene in a "push broom" imaging mode. In other words, the camera is, preferably, translated laterally with respect to the scene in such manner and direction that the line image formed by each of the rows sweeps across the scene in a direction substantially perpendicular to the long dimension of the rows. The camera acquires a sequence of line images from each row of the detector array along a succession of parallel lines.

Alternatively, the field of view of the camera may be scanned, or objects in the scene may move laterally with respect to the camera, to the same effect.

Preferably, the acquisition of images by the camera is synchronized with the translation or scanning of the detector array relative to the scene, such that a portion of the scene imaged by any row of the array (except the first row) at any point in the sequence of images acquired by the camera is substantially the same, except for having a different distance window, as the portion of the scene imaged by the preceding row of the array at the preceding point in the sequence. In this manner, a complete three-dimensional image of the scene is acquired, since for each point in the scene, the intensity of the reflected light is measured as a function of distance from the camera over a wide range of distances.

In other preferred embodiments of the present invention, the camera includes scanning optics, which focus and modulate a line image of the scene, so that the line image is projected onto each of the rows of the detector array in succession. Thus, there is a successive distance window associated with each row of the array, which window is defined by the time during which the line image dwells on the row. Distances to objects in the scene intersected by the line image, within each of the successive distance windows, are determined in accordance with the method described above. The scanning optics may include a high-speed opto-mechanical scanner, an acousto-optical or electro-optical modulator, or other types of scanners known in the art.

In some preferred embodiments of the present invention, the camera includes three detector arrays, with associated color filters, preferably red, green and blue, as are known in the art, and thus acquires color images of the scene. Alternatively, the camera may include only one or two detector arrays, having one or more stripe or mosaic color filters, known in the art, associated therewith, so as to acquire color images. Thus, image intensity, color and depth information are simultaneously acquired regarding each pixel of the array.

In some preferred embodiments of the present invention, two-dimensional intensity and/or color images and three-dimensional distance images (i.e., pixel-by-pixel distance information) are mutually registered and superimposed to produce and present depth images to a user of the camera. Such depth images may be produced using any methods known in the art, for example by drawing iso-distance contour lines on a two-dimensional picture, or by using pseudo-color to indicated distances in a monochrome image, or by means of a computer-generated isometric projection.

In some preferred embodiments of the present invention, the camera is mounted on a moving platform, for example on an aircraft, so as to acquire topographical images of the ground over which the aircraft is flying, or alternatively on a seaborne platform, either underwater or on the water's surface, or on a space-borne platform. Preferably, the camera operates in push-broom mode, as described above, and image acquisition by the camera is synchronized with the ground speed of the moving platform. Images acquired by the camera are preferably used to map features and objects below the platform and may also be used to compute the three-dimensional volumes of such features and objects. In other preferred embodiments of the present invention, the camera is mounted on or otherwise associated with a robot, which uses the three-dimensional image information provided by the camera to guide its action in a desired task.

Alternatively or additionally, in some preferred embodiments of the present invention, the camera is used in quality assurance or quality control of a manufacturing process, for example to determine multiple dimensions of an article of manufacture and verify its compliance with a standard. Similarly, by measuring surface contours of a bulk material or goods stored in a container, whose size is likewise known or measured using the camera, the volume of the material or goods may be determined.

In other preferred embodiments of the present invention, the camera is used in a model scanner, to acquire three-dimensional images of an object of interest. Preferably, the images are color images. In one such preferred embodiment, these three-dimensional images are used in conjunction with a system for rapid, three-dimensional prototype modeling, as is known in the art, to reproduce one or more three-dimensional copies or models of the object of interest, including surface color reproduction.

In still other preferred embodiments of the present invention, the camera is mounted on a vehicle, for use in a collision avoidance system, for example, by identifying possible hazards and determining the distance from the vehicle to the hazards.

In other preferred embodiments of the present invention, a ranging camera as described above is used in conjunction with an endoscope to acquire three-dimensional images of a region of interest inside a patient's body.

In another preferred embodiment of the present invention, the camera is coupled to a sensory matrix for use by a blind person. For example, the sensory matrix may comprise a multiplicity of pins, which are actuated to press against the blind person's skin, for example on his or her forehead, wherein the pressure exerted on the skin by each of the pins is proportional to the distance from the person to an object at a corresponding point in the scene viewed by the camera. Preferably, the blind person controls the camera's distance window, so that the range of pressures exerted by the pins corresponds to a desired distance range from the person.

There is therefore provided, in accordance with a preferred embodiment of the present invention, apparatus for creating an image indicating distances to objects in a scene, including:

a modulated source of radiation, having a first modulation function, which directs radiation toward a scene;

a detector, which detects radiation reflected from the scene, modulated by a second modulation function, and generates, responsive to the detected modulated radiation, signals responsive to the distance to regions of the scene;

a processor, which receives signals from the detector and forms an image, based on the signals, having an intensity value distribution indicative of the distance of objects from the apparatus; and a controller, which varies at least one of the first and second modulation functions, responsive to the intensity value distribution of the image formed by the processor.

There is further provided, in accordance with a preferred embodiment of the present invention, apparatus for creating an image indicating distances to objects in a scene, including:

a modulated source of radiation, having a first modulation function, which directs radiation toward a scene;

a detector, including a detector modulator, having a second modulation function, and a detector array, which array includes a plurality of detector elements, wherein the detector detects radiation reflected from a plurality of parallel spatial segments within the scene and generates, responsive to the detected radiation, signals responsive to the distance to regions of the scene; and a processor, which forms an image including at least some of the plurality of spatial segments and having an intensity value distribution indicative of the distance of objects from the apparatus, wherein each of the plurality of spatial segments has distance bounds, relative to the apparatus, which distance bounds are determined by the detector modulator, and wherein at least one of the plurality of spatial segments has distance bounds that are different from the bounds of at least one other spatial segment.

There is also provided, in accordance with a preferred embodiment of the present invention, a system for creating an extended image indicating distances to objects in a scene, which system includes:

apparatus for creating an image as described above, which apparatus forms a plurality of sequential images of the scene, at least one of the plurality of images including one or more regions of the scene not included in at least one other of the images; and an image processor, which combines the plurality of images to form an extended image, indicating distances to objects in the scene.

There is further provided, in accordance with a preferred embodiment of the present invention, apparatus for creating an image indicating distances to objects in a scene, including:

a modulated source of radiation, which directs radiation toward a scene;

telecentric optics, which receive and collimate radiation reflected from the scene;

a modulator, which modulates the collimated radiation;

a detector, which detects an image formed from the modulated collimated radiation; and a processor, which forms an image having an intensity value distribution indicative of the distance of objects from the apparatus, responsive to the intensity distribution of the detected image, wherein the source and the detector are boresighted, and wherein the modulator that modulates the collimated radiation reflected from the scene does not modulate the radiation directed toward the scene by the source.

There is additionally provided, in accordance with a preferred embodiment of the present invention, apparatus for creating an image indicating distances to objects in a scene, including:

a modulated source of radiation, having a first modulation function, which directs radiation toward a scene;

a first detector, which detects radiation reflected from the scene, modulated by a second modulation function, and generates, responsive to the detected modulated radiation, signals responsive to the distance to regions of the scene;

a second detector, boresighted with the first detector, which detects radiation reflected from the scene, unmodulated by the second modulation function, and generates, responsive to the detected radiation, signals responsive to the intensity of light reflected from the regions of the scene;

a processor, which receives signals from the first and second detectors and forms an image, based on the signals, having an intensity value distribution indicative of the distance of objects from the apparatus.

there is further provided, in accordance with a preferred embodiment of the present invention, a system for robot guidance, including apparatus for creating an image indicating distances to objects in a scene, as described above and a robot, which acts upon an object in the scene, using the distance to the object indicated by the apparatus for guidance.

There is additionally provided, in accordance with another preferred embodiment of the present invention, a system for determining dimensions of an article, including apparatus for creating an image of the article, indicating distances to regions of the article, and a computer, which determines the dimensions of the article, using the image and the indicated distances. Preferably, the computer compares the dimensions with a standard. Alternatively or additionally, the computer determines the volume of the article, using the determined dimensions.

There is also provided, in accordance with still another preferred embodiment of the present invention, a system for producing a three-dimensional model of an article, including a system for determining dimensions of the article, as described above, and rapid prototyping apparatus, which receives the dimensions determined by the system for determining dimensions, and produces the three-dimensional model according to the dimensions. Preferably, the rapid prototyping apparatus receives image information, more preferably including color information, from the apparatus for creating the image of the article and applies the image information to a surface of the three-dimensional model.

There is further provided, in accordance with a preferred embodiment of the present invention, a system for vehicle guidance, including apparatus for creating an image indicating distances to objects in a scene ahead of the vehicle in a direction of motion thereof, as described above, and a processor, which identifies hazards in the scene, using the image and the indicated distances.

There is additionally provided, in accordance with a preferred embodiment of the present invention, a system for endoscopic imaging, including an endoscope, having a distal end for insertion into the body of a subject and a proximal end for coupling of optical apparatus thereto, and apparatus for creating an image, as described above, which apparatus is coupled to the proximal end of the endoscope, so as to direct radiation through the endoscope into the body, and detect radiation reflected therefrom.

There is additionally provided, in accordance with a preferred embodiment of the present invention, a system for creating tactile images of a scene, including a range-finding camera for creating an image of a scene, including distance information regarding a plurality points in the scene, as described above, and an addressable matrix of tactile probes, in contact with a surface on the body of a subject, each of which probes exerts a pressure on the surface responsive to the distance to a respective one of the plurality of points in the scene.

There is further provided, in accordance with a preferred embodiment of the present invention, microchannel array apparatus for modulating a flux of electrons, including:

a microchannel plate, through which the electrons are accelerated; and a plurality of switchable electrodes adjacent to the microchannel plate, each of which electrodes modulates the acceleration of electrons in a corresponding region of the plate.

Preferably, the microchannel array comprises a photocathode, which receives electrons accelerated through the microchannel plate and generates photons responsive to the electrons, and wherein the electrodes comprise conductive, transparent material coated on the photocathode.

There is also provided, in accordance with a preferred embodiment of the present invention, a camera system for forming an image of a scene, including:

a photoanode, which generates, responsive to radiation incident thereon from the scene, a flux of electrons;

microchannel array apparatus, as described above, which modulates and generates photons in response to the flux of electrons; and a detector, which receives the photons and forms the image of the scene responsive thereto.

There is also provided, in accordance with a preferred embodiment of the present invention, a method for creating an image indicating distances to objects in a scene, including:

modulating radiation from a radiation source according to a first modulation function, and directing the radiation toward a scene;

modulating radiation reflected from the scene according to a second modulation function;

detecting the reflected radiation and generating signals responsive to the distance to regions of the scene, in response to the detected radiation;

forming an image having an intensity value distribution indicative of the distance to objects in the scene; and varying at least one of the first and second modulation functions, responsive to the intensity value distribution of the image.

There is moreover provided, in accordance with a preferred embodiment of the present invention, a method for creating an image indicating distances to objects in a scene, including:

modulating radiation from a radiation source according to a first modulation function, and directing the radiation toward a scene;

defining a plurality of parallel spatial segments within the scene, each such segment having distance bounds;

detecting radiation reflected from each of the parallel spatial segments and generating signals responsive to the distance to regions of the scene, in response to the detected radiation; and forming an image having an intensity value distribution indicative of the distance to objects in the scene, wherein defining the plurality of spatial segments includes defining the distance bounds of each of the plurality of segments, and wherein the distance bounds of at least one of the plurality of spatial segments are different from the distance bounds of at least one other spatial segment.

There is further provided, in accordance with a preferred embodiment of the present invention, a method for creating an extended image indicating distances to objects in a scene, including:

creating a first image of a scene, according to the method described above;

scanning the spatial segments laterally, relative to the scene;

creating a second image of the scene, in the same manner as the first image was created; and registering and combining the first image with the second image, to create the extended image.

There is also provided, in accordance with a preferred embodiment of the present invention, a method for creating a mixed image, including an object of interest superimposed on a separately acquired background image, said method including:

creating a first image of a scene including the object of interest, the first image indicating distances to objects in the scene;

determining the distance to the object, as indicated by the first image;

defining a range of distances that includes the distance to the at least one object;

removing from the first image objects outside the range of distances to form a filtered image; and superimposing the filtered image on the background image.

There is further provided, in accordance with a preferred embodiment of the present invention, a method for creating a mixed image of a scene, including a desired inset image inserted into a selected zone in the mixed image, said method including:

marking a zone in the scene;

creating a first image of the scene including the marked zone, the first image indicating distances to objects in the scene;

determining the location of the boundaries of the zone in the first image and the distance to the zone, as indicated by the first image;

scaling the inset image to fit within the boundaries of the zone, in accordance with the distance to the zone; and superimposing the scaled inset image on the zone in the first image to form a mixed image.

Preferably, the method further includes identifying an object of interest in the first image, wherein the distance to the object of interest is less than the distance to the zone; filtering the first image so as to form a filtered image of the object of interest; and superimposing the filtered image of the object of interest on the inset image in the zone.

The present invention will be more fully understood from the following detailed description of the preferred embodiments thereof, taken together with the drawings in which:

BRIEF DESCRIPTION OF THE DRAWINGS

FIG. 7 is a schematic illustration of an adaptive optical ranging camera system, in accordance with a preferred embodiment of the present invention;

DETAILED DESCRIPTION OF PREFERRED EMBODIMENTS

Figure 1:
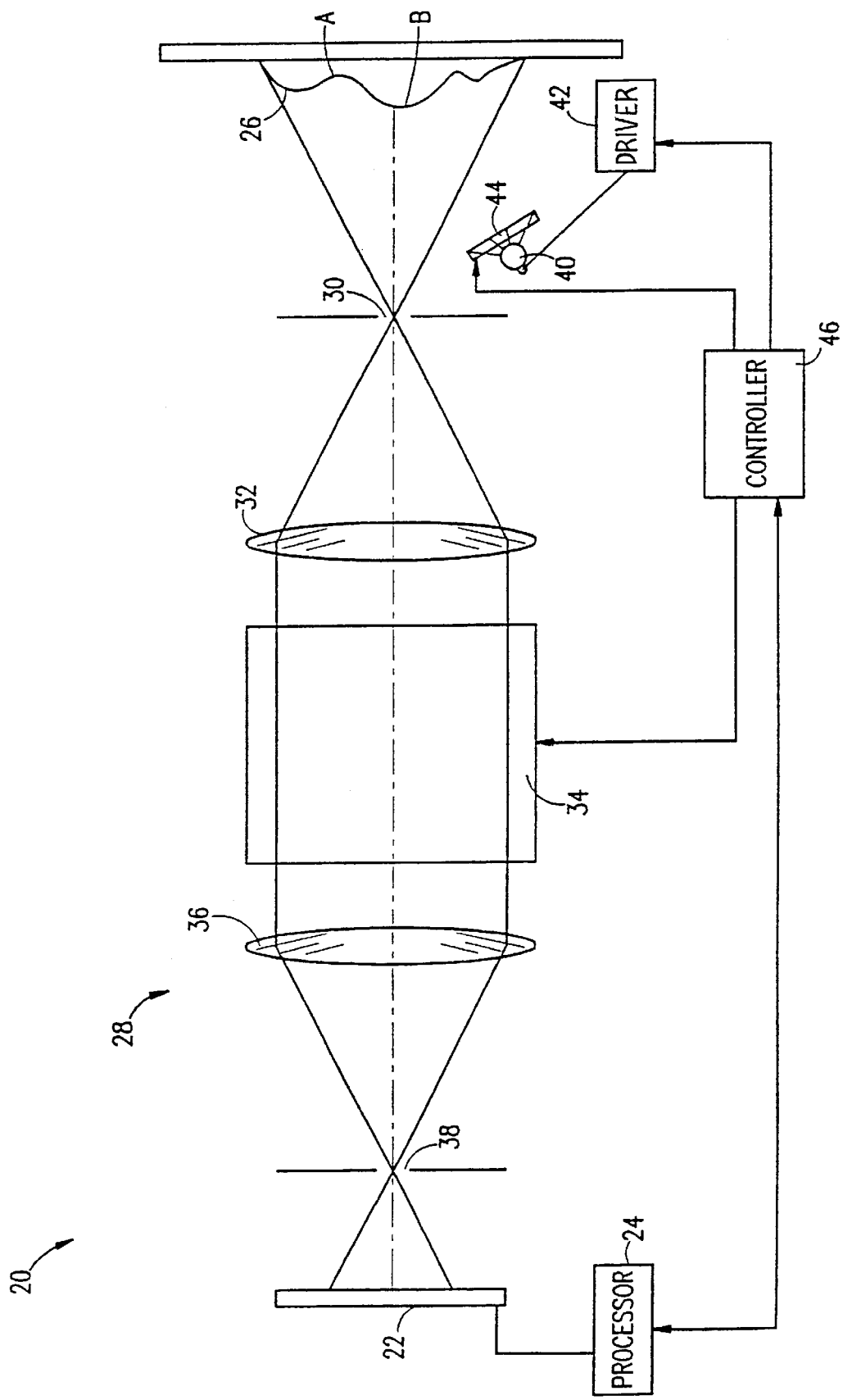
FIG. 1 is a schematic illustration of an optical ranging camera, in accordance with a preferred embodiment of the present invention.

Reference is now made to FIG. 1, which illustrates an optical ranging camera 20 in accordance with a preferred embodiment of the present invention, as described in the second above-mentioned PCT patent application filed on even date and incorporated herein by reference. Camera 20 comprises a detector array 22, preferably a CCD array, such as the KAF 0400 CCD array, manufactured by Eastman Kodak, Rochester, N.Y., of the HS 0512J CCD array, manufactured by EG&G Reticon, Sunnyvale, Calif. Signals generated by CCD 22 are processed by a video processor 24, which preferably produces a three-dimensional digital image of a scene 26 imaged by the camera, or alternatively, a two-dimensional video image in which distances to objects of interest are indicated, as will be described below.

Camera 20 further includes an optical assembly 28, which modulates light received from scene 26. Assembly 28 comprises an entrance iris 30, a collecting lens 32, an optical modulator 34, a focusing lens 36 and an exit iris 38. Preferably, iris 30 and collecting lens 32 form a telecentric optical system, whereby lens 32 collimates the light received from scene 26 onto modulator 34. Optical modulator 34 preferably comprises an electro-optical modulator, such as a crystal of KDP or other suitable material, known in the art, but may alternatively comprise light modulators of other types known in the art, such as acousto-optic modulators, liquid crystal shutters or high-speed mechanical shutters. It will be understood that for simplicity of explanation, assembly 28 is shown only schematically here, and that in practice camera 20 will generally include additional lenses and/or other optical elements known in the art.

Camera 20 also includes a light source 40, preferably comprising a high-power laser diode, such as the OPC-1003-813 laser diode, manufactured by Opto Power Corporation, City of Industry, Calif., and suitable optics as are known in the art, to provide generally uniform illumination of scene 26 by the laser diode. Alternatively, light source 40 may comprise a laser of any other suitable type or an incoherent source of light, such as a strobe lamp, for example. Driver circuitry 42 provides input power to light source 40. A light modulator 44, which may be of the same type as modulator 34, is associated with light source 40 to modulate the illumination of scene 26. As a further alternative, driver circuitry 42 may provide suitably modulated input power to the light source, so as to modulate the illumination of the scene without the need for additional modulator 44.

A controller 46 regulates the modulation of the illumination of scene 26 by controlling modulator 44 and/or circuitry 42, as well as controlling modulator 34 to modulate radiation reflected from the scene and incident on array 22. Preferably, controller 46 communicates with video processor 24, so that the modulation of the illumination and reflected radiation may be varied adaptively, as will be described below.

Figure 2A:
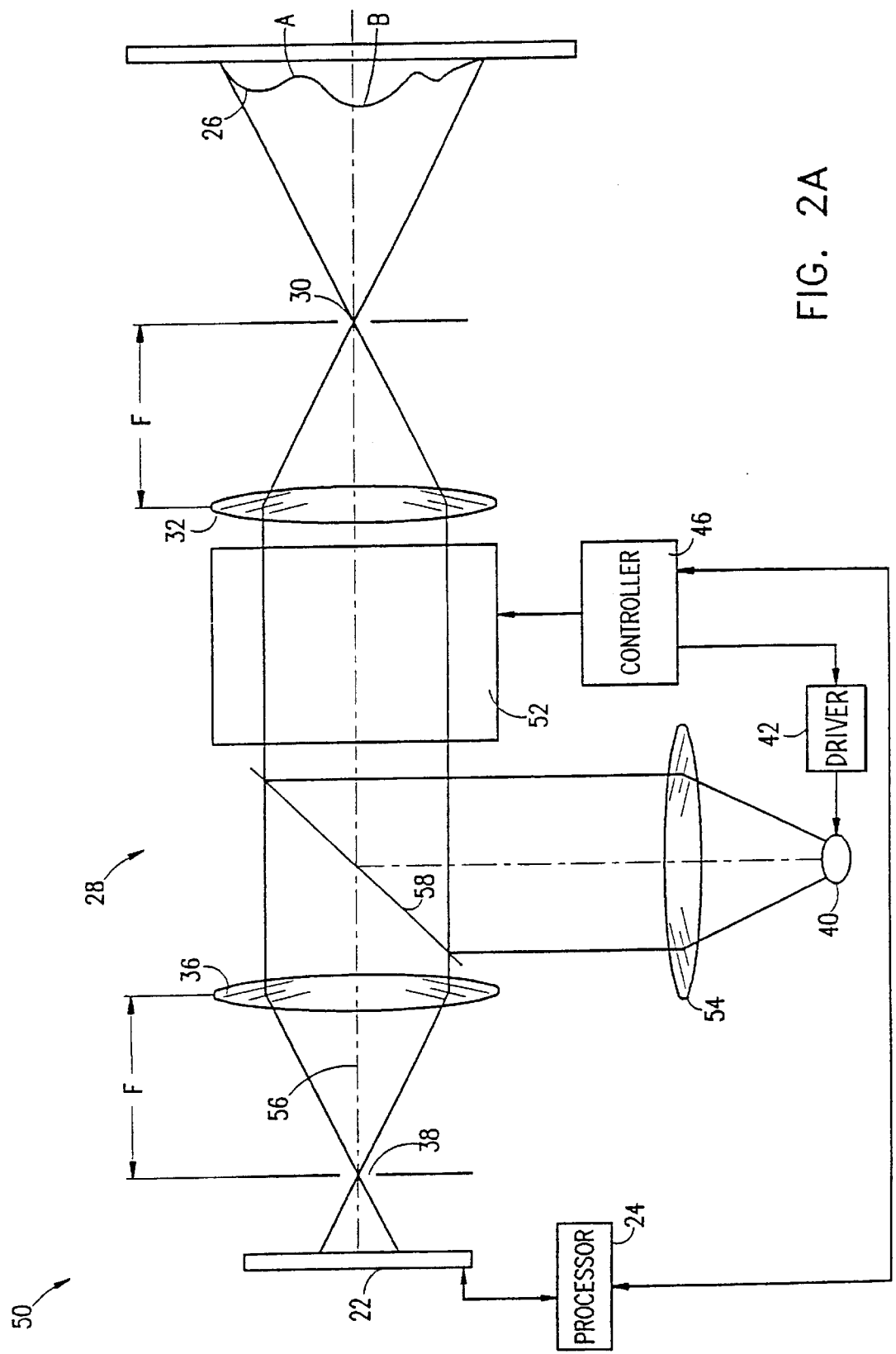
FIG. 2A is a schematic illustration of a telecentric optical ranging camera, in accordance with a preferred embodiment of the present invention.

FIG. 2A shows an alternative preferred embodiment of the present invention, including a telecentric optical ranging camera 50, as described in the second PCT patent application filed on even date and incorporated herein by reference. Camera 50 comprises detector array 22, optical assembly 28 and light source 40. Camera 50 is generally similar to camera 20, but differs from it primarily in that in camera 50, a common modulator 52 modulates both the illumination from source 40 and the radiation reflected back from scene 26 to array 22. Modulator 52 preferably comprises a KDP crystal, or alternatively, any other suitable type of modulator, as described above. Illumination from source 40 is substantially collimated by a projection lens 54 and boresighted with optical axis 56 using a beam combiner 58.

Modulator 52 may be used to apply a common modulation waveform to both the illumination and the reflected radiation. In preferred embodiments of the present invention, however, modulator 52 is driven by controller 46 to apply multiple waveforms, preferably a first waveform that is applied to the illumination and a second waveform that is applied to the reflected radiation, as will be described below.

It will be appreciated that while the first and second waveforms are respectively applied, modulator 52 will generally transmit indiscriminately both the illumination and the reflected radiation. Preferably, therefore, video processor 24 controls array 22 so that the array generates signals only in response to radiation transmitted by modulator 52 due to the second waveform. Thus, for example, in preferred embodiments of the present invention wherein array 22 comprises a CCD array, as described above, video processor 24 preferably activates the array's electronic shutter, as is known in the art, in synchrony with the second waveform. Similarly, driver circuitry 42 preferably drives light source 40 in synchrony with the first waveform.

Figure 2B:
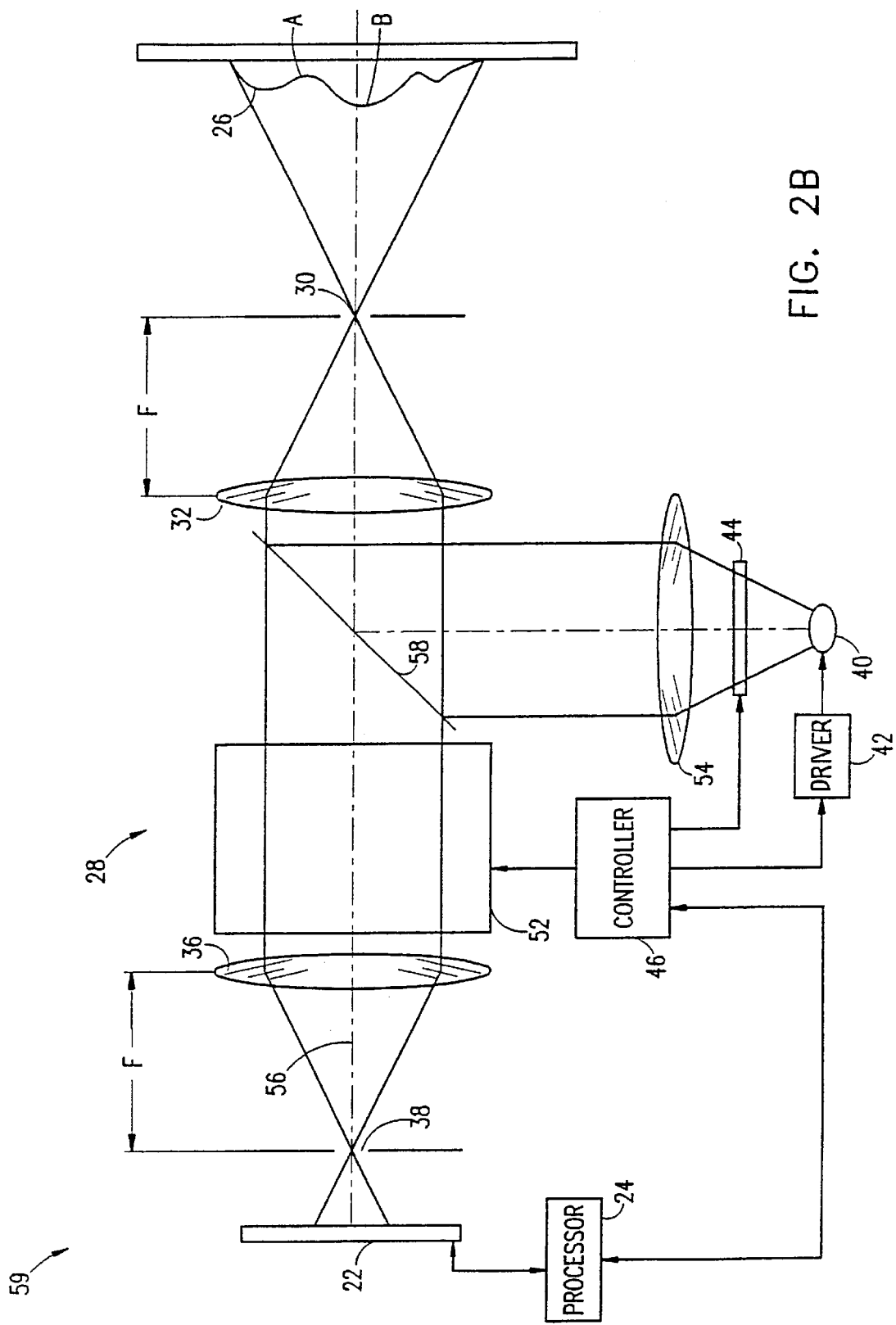
FIG. 2B is a schematic illustration of another telecentric optical ranging camera, in accordance with an alternative preferred embodiment of the present invention.

FIG. 2B shows still another preferred embodiment of the present invention, including a telecentric optical ranging camera 59. Camera 59 is similar to camera 50 shown in FIG. 2A, except that camera 59 includes modulator 44 for modulating the illumination of scene 26, independent of modulator 52, which modulates the reflected radiation. Thus, the modulation waveforms that are applied to camera 20, as will be described below, may equally be applied to telecentric camera 59, with similar results.

Figure 2C:
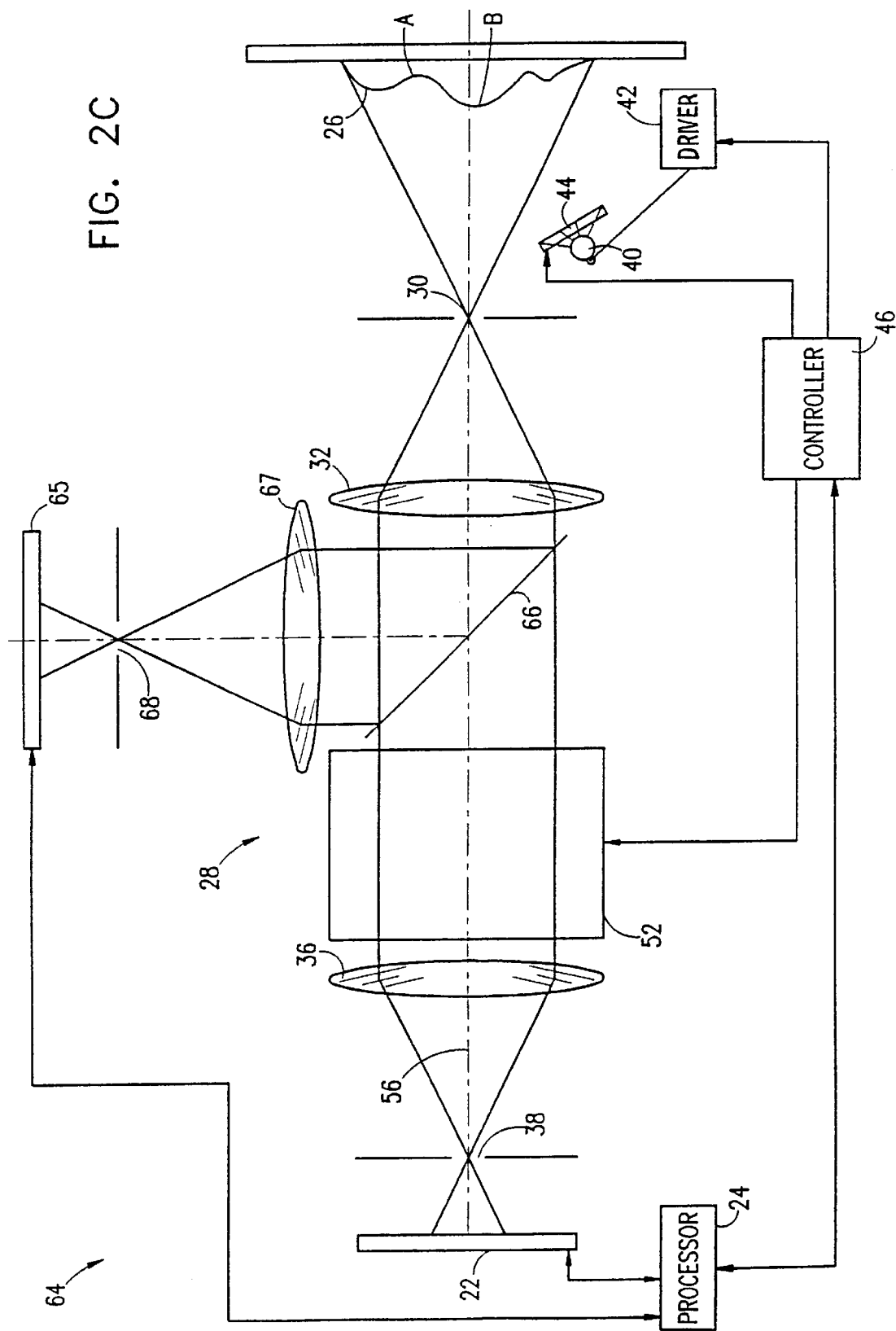
FIG. 2C is a schematic illustration of yet another optical ranging camera including two detector arrays, in accordance with a preferred embodiment of the present invention.

FIG. 2C shows yet another preferred embodiment of the present invention, including a telecentric optical ranging camera 64 having two detector arrays 22 and 65. Detector array 22 receives radiation that has been reflected from scene 26 and modulated by modulator 52, substantially as described with respect to the detector array in FIG. 2B and in the other preferred embodiments described above. Array 65, however, receives radiation from scene 26 that is not modulated after reflection from the scene. Array 65 is boresighted with array 22, by means of a beamsplitter 66. An imaging lens 67 and an exit iris 68 thus form a non-modulated image of scene 26 on array 65, which image is preferably substantially registered with the (modulated) image formed on array 22.

As noted above regarding camera 59, the modulation waveforms that are applied to camera 20, as will be described below, may equally be applied to camera 64, with similar results with respect to the images received by array 22. The usefulness of the non-modulated images received by array 65 will also be described below.

Although the preferred embodiments illustrated in FIGS. 1, 2A, 2B and 2C comprise telecentric imaging elements, it will be understood that the principles of the present invention may similarly be applied to produce non-telecentric optical ranging camera, such as that shown and described in the first PCT patent application mentioned above.

Figure 3:
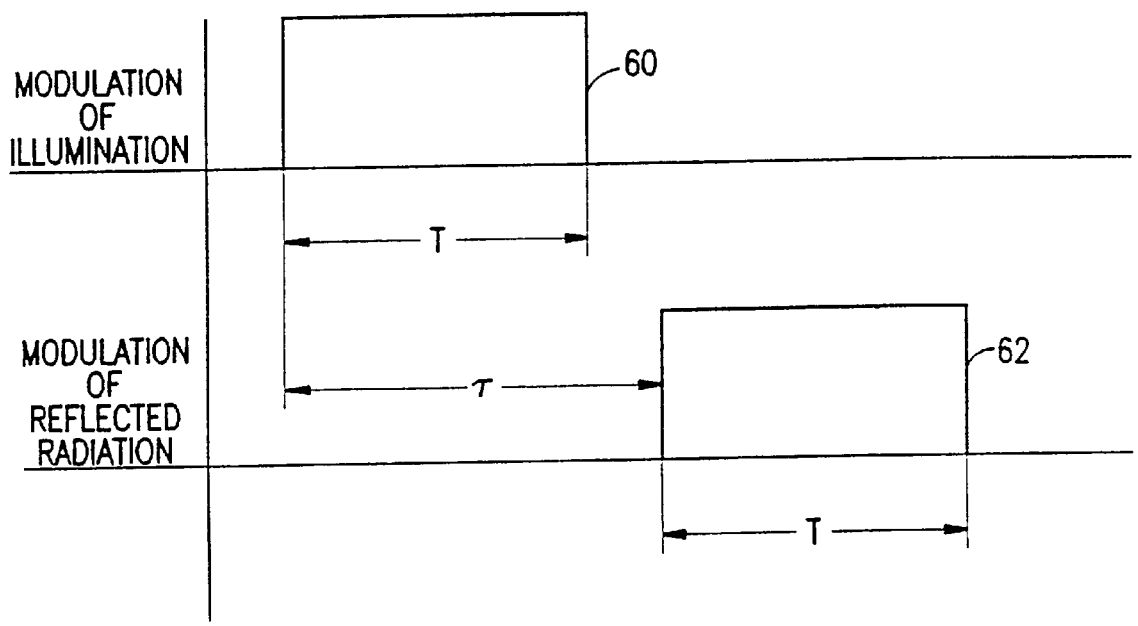
FIG. 3 is a schematic diagram showing waveforms illustrative of a modulation scheme for use in conjunction with the camera of FIG. 1 or 2B, in accordance with a preferred embodiment of the present invention.

FIG. 3 schematically illustrates waveforms 60 and 62 used to drive modulators 44 and 34, shown in FIG. 1, so as to modulate the illumination of scene 26 and the reflected radiation therefrom, respectively. Both waveforms preferably have rectangular pulse shapes as shown. When each of the waveforms is at its high value, the respective modulator allows light to pass therethrough. When the waveform is at its low value, the modulator blocks the light. Preferably, both waveforms 60 and 62 maintain their high values, opening the respective modulators, for a period T, wherein the opening of modulator 34 is delayed by a time $\tau$ relative to modulator 44.

Although the waveforms in FIG. 3 have rectangular pulse shapes, other waveform shapes may also be used, some examples of which will be described below. It will also be understood that the pulse shapes in FIG. 3 are idealized, for the sake of simplicity in the following explanation, but such ideal pulse shapes are not necessary to the operation of the present invention.

Figure 4:
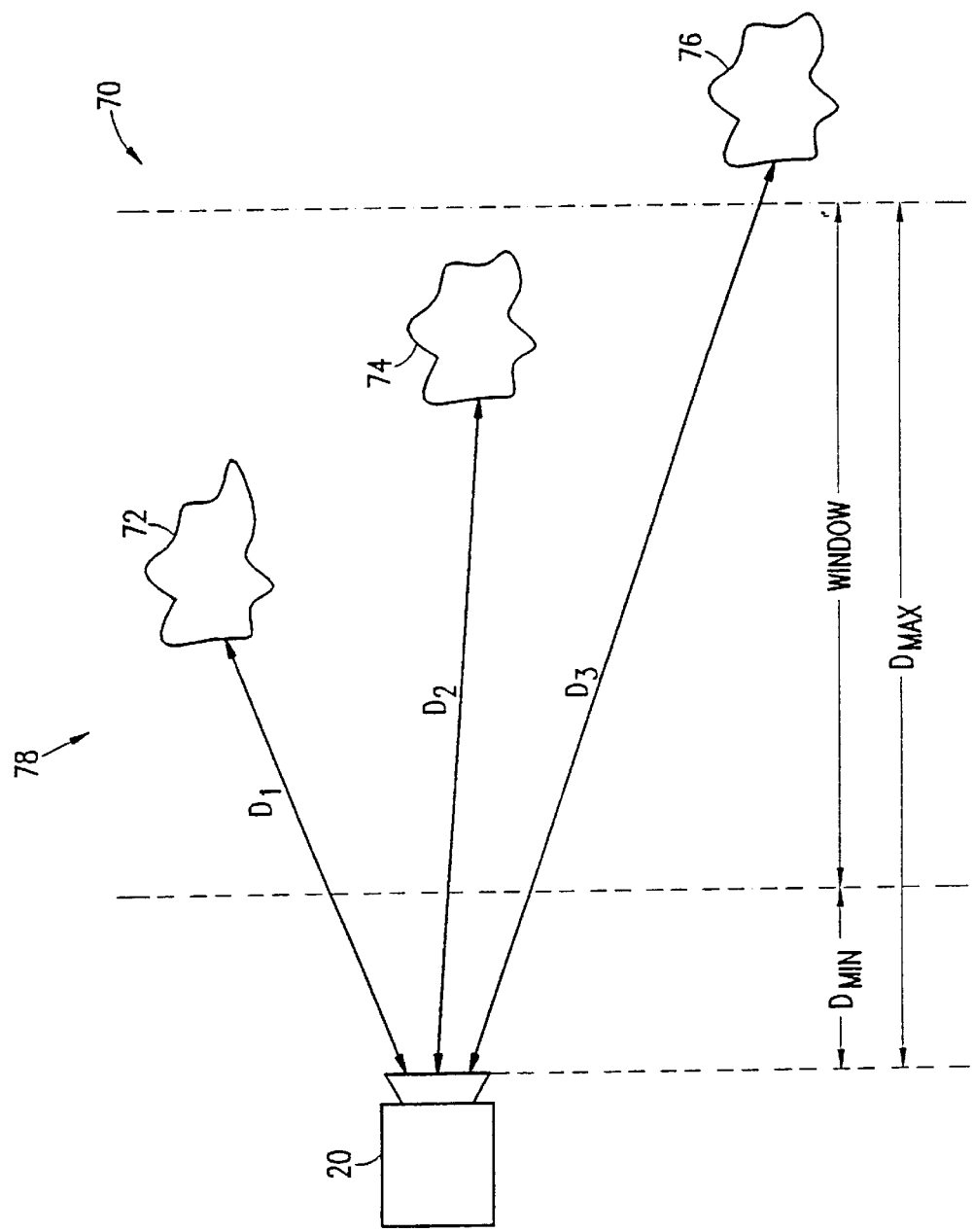
FIG. 4 is a schematic illustration of a scene imaged by a ranging camera, in accordance with a preferred embodiment of the present invention.

FIG. 4 is a schematic illustration of a scene 70 imaged by camera 20, as shown in FIG. 1, wherein the camera is controlled in accordance with the waveforms shown in FIG. 3. Scene 70 contains a plurality of objects, including a first object 72, a second object 74 and a third object 76, located at respective distances $D_1$, $D_2$ and $D_3$ from camera 20. When objects 72, 74 and 76 are illuminated by light source 40, contained in camera 20, they generally reflect light back toward the camera, which light is collected by optical assembly 28 and focused onto detector array 22. Assuming for the moment that modulators 34 and 44 are operated in a CW mode, i.e., held constantly open, the light reflected from each of the objects will produce a respective, substantially constant irradiance at the one or more elements of the detector array onto which the image of the respective object is focused. The level of irradiance is generally a function, inter alia, of the distance of the respective object from the camera and the spectral emissivity of the object. In response to these substantially constant irradiances, the elements of detector array 22 generate respective baseline signal levels $S_1$, $S_2$ and $S_3$.

When modulators 34 and 44 are driven by waveforms 62 and 60, respectively, however, the signals generated by array 22 in response to light reflected from objects 72, 74 and 76 will differ from the baseline signals, due to the transit time needed for light emitted by light source 40 to reach each of the objects and return to camera 20. This transit time can generally be expressed as $t_i = 2D_i/c$, where c is the speed of light, and the index i refers to the ith object in scene 70. The choice of values of T and $\tau$, as shown in FIG. 3, defines a distance window 78, bounded by minimum and maximum distances, $D_{min}$ and $D_{max}$, respectively, wherein $D_{min}=(\tau-T)c/2$ and $D_{max}=(\tau+T)c/2$, unless $\tau<T$, in which case $D_{min}=0$. When modulators 34 and 44 are operating as indicated, light from objects outside window 78, such as object 76, for which $D_3>D_{max}$, will be rejected by modulator 34, and therefore, array 22 will not generate substantial signals in response to such objects.

Figure 5:
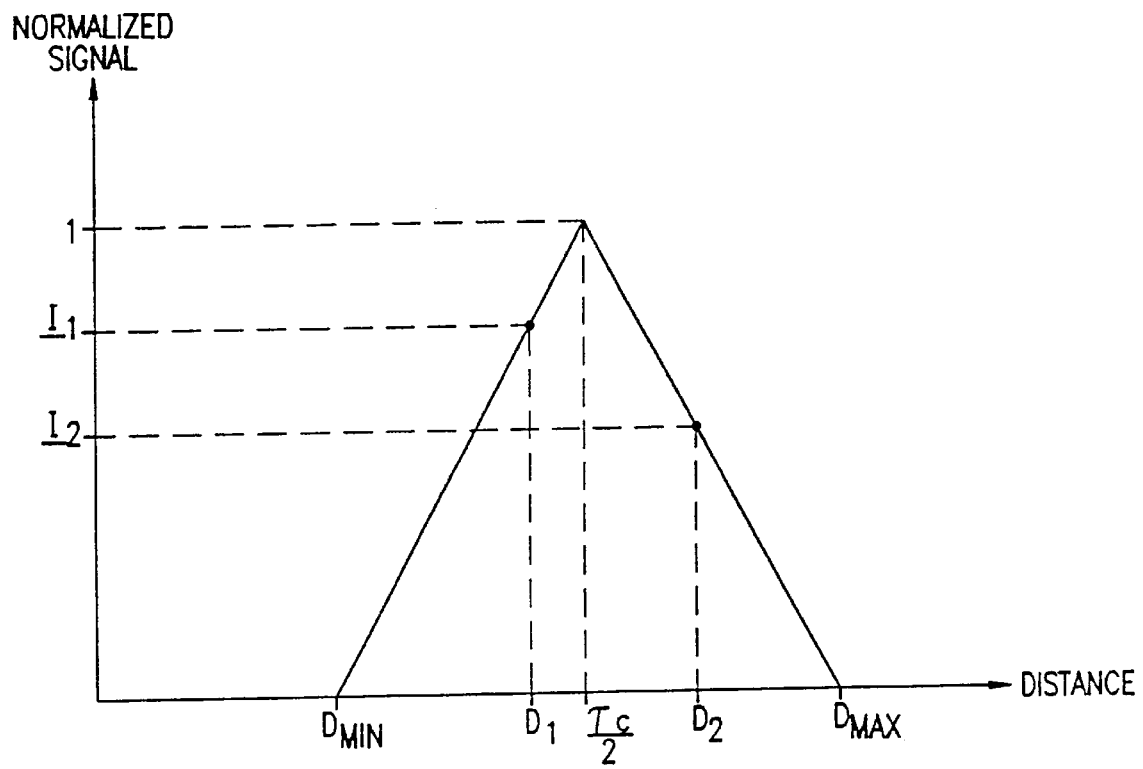
FIG. 5 is a schematic illustration of a distance-dependent image filtering function, obtained by applying the waveforms shown in FIG. 3 to the camera of FIG. 1 or 2B, in accordance with a preferred embodiment of the present invention.

Furthermore, as illustrated in FIG. 5, the strength of the signal $I_i$ generated by array 22 in response to an object within window 78, such as object 72 or 74, is substantially linearly dependent on the object's distance from the camera. The signals $\underline{I}_1$ and $\underline{I}_2$, corresponding respectively to objects 72 and 74, are normalized generally according to the formula:

$$\underline{I}_i = I_i / S_i \tau f \qquad (1)$$

where $I_i$ is the non-normalized signal due to the ith object, and f is the appropriate field rate or frame rate at which array 22 is sampled.

The baseline signal levels $S_i$ may be acquired by detector array 22 while holding modulators 34 and 44 temporarily open, as described above. Alternatively, as shown in FIG. 2C, detector array 65 in camera 64 may be used for the purpose of acquiring these baseline signals. The light impinging on array 22 is modulated, as described above, for the purpose of acquiring distance information, while the light impinging on the array 65 is substantially unmodulated (except to the extent that radiation source 40 is modulated). Thus the distance-responsive signal $I_i$ and the baseline signals $S_i$ are acquired simultaneously.

In some preferred embodiments of the present invention, however, in which T and $\tau$ are chosen to be substantially smaller than the field or frame period, 1/f, the waveforms shown in FIG. 3 may be repeated multiple times in sequence during a single field or frame. In this case, the non-normalized signal $I_i$ will generally be increased in proportion to the number of times the waveforms are repeated during each field or frame, which increase will typically improve the signal/noise ratio in images captured by the camera. As is known in the art, if N is the number of times the waveforms are repeated during a single field, the improvement in signal/noise ratio will typically be in the range between the square root of N and N, depending on whether the noise is source-dominated or circuit-dominated. Since T and $\tau$ are both typically less than one microsecond, the waveforms may preferably be repeated a thousand times (or more) during a single video field of approximately 16 msec duration, resulting in a signal/noise improvement of a factor of 30 or more.

The linear functional dependence of the normalized signal on the distance from camera 20 is the result of the varying overlap of illumination waveform 60 with reflected radiation modulation waveform 62, after waveform 60 has been effectively delayed by the time $2D_i/c$ required for the light emitted by illumination source 40 to reach the respective object and return to the camera. This function has a maximum value when the object is located at a distance $D_i = \tau c/2$ and a width $(D_{max} - D_{min})$ that is proportional to T. The distance from camera 20 to an object within window 78 can thus be determined from the normalized signal generated in response to the object. The normalized signal $\underline{I}_1$ due to object 72, located near the center of the window, for example, will be substantially greater than $\underline{I}_2$, due to object 74, which is located at a greater distance from the camera.

Although waveforms 60 and 62 are described above as having equal durations T, these waveforms may alternatively have different durations, $T_{60}$ and $T_{62}$, respectively. For example, $T_{60}$ or $T_{62}$ may be extended to provide stronger signals $I_1$ and $I_2$. As a result, however, the functional dependence of the normalized signal on the object distance will no longer have the triangular form shown in FIG. 5, but will rather be trapezoidal, so that distance differences in a central portion of the window will be unresolved. Therefore, in preferred embodiments of the present invention, the durations of waveforms 60 and 62 are equal. This method of determining object distances is further described in the above mentioned PCT patent applications, which have been incorporated herein by reference. As described in these PCT applications, other modulation waveforms may similarly be used to drive modulators 34 and 44, but the general dependence of the normalized signals on object distance and the applications of camera 20 as described herein may be most easily explained with reference to the rectangular pulse waveforms shown in FIG. 3.

It will further be understood that although waveforms 60 and 62 are shown as being ideally rectangular, in actuality the waveforms applied the source and reflected radiation by modulators 34 and 44, respectively, will generally have finite rise times and fall times, as illustrated, for example, in FIG. 6A below. As a result, the corners of the response function will be rounded, rather than sharp as shown in FIG. 5. The principles of the present invention, however, are equally applicable when other, non-ideal waveforms are used.

It will also be understood from the above discussion that the center location of window 78 may be controlled by varying $\tau$, and the width of the window may be controlled by varying T. Preferably, when an object of interest is identified in a scene, $\tau$ is controlled adaptively by controller 46, either automatically or under the command of an operator of the camera, so as to maintain the object of interest near the center of the window, where the normalized signal due to the object will be greatest.

Furthermore, T is preferably controlled by controller 46 so as to limit the width of window 78 to include only a range of object distances from the camera in which objects of interest are found. This limitation of T is useful in improving the accuracy of object distance determination, by increasing the slope of the dependence of the normalized signals on distance, as shown in FIG. 5, so that the differences in normalized signals between objects at different distances are greater. Limiting T is further useful in reducing image "clutter," by eliminating from the image acquired by array 22 objects that are not of interest, for example object 76 in FIG. 4.

In some preferred embodiments of the present invention, $\tau$ and T are controlled by controller 46 to optimize the dynamic range of object and distance detection by camera 20. For example, when a scene includes several objects of interest at different distances from the camera, $\tau$ and T may be controlled to shift the center of the window approximately to the distance of the farthest object from the camera. As is known in the art, the irradiance produced at array 22 by light reflected from an object generally decreases as the third to fourth power of the object from the camera. Thus, the (non-normalized) signal generated in response to the farthest object will generally be the weakest of the signals, and shifting the center of the window to the distance of the farthest object helps to maximize the dynamic range of this signal. Similarly, if one of the objects has substantially lower reflectance than another object or objects, the window may be centered on the low-reflectance object so as to enhance the dynamic range of the signal due thereto.

Figure 6A:
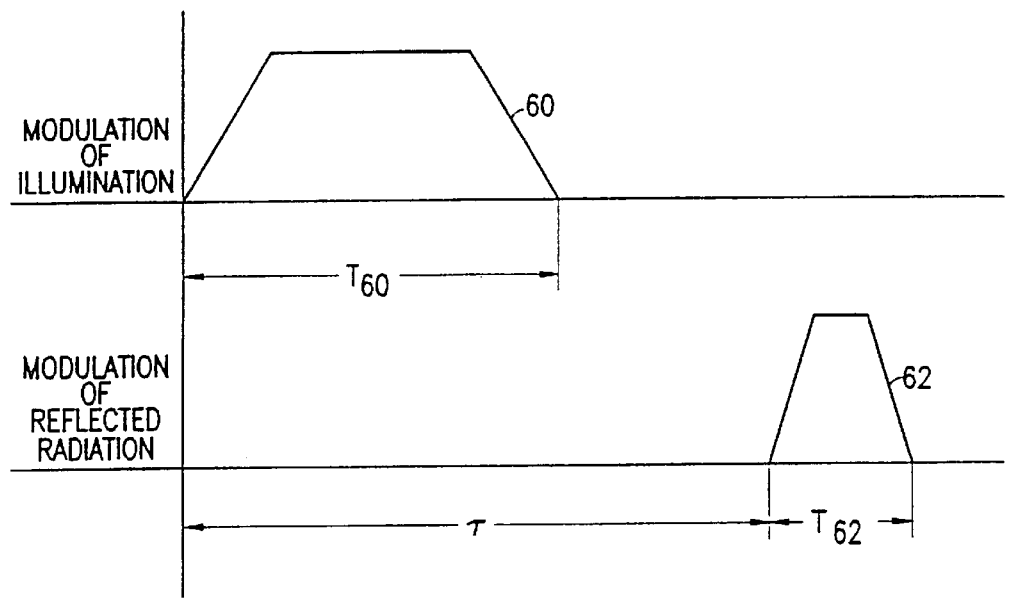
FIG. 6A is a schematic diagram showing waveforms illustrative of an alternative modulation scheme for use in conjunction with the camera of FIG. 1 or 2B, in accordance with another preferred embodiment of the present invention.

FIG. 6A is a timing diagram illustrating an alternative preferred embodiment of the present invention, in which waveform 60, applied to modulate the illumination, and waveform 62, applied to modulate the reflected radiation, comprise generally trapezoidal pulse shapes, more nearly approximating actual modulation waveforms than the idealized square pulses of FIG. 3. Furthermore, the duration $T_{60}$ of waveform 60 is substantially longer than duration $T_{62}$ of waveform 62.

Figure 6B:
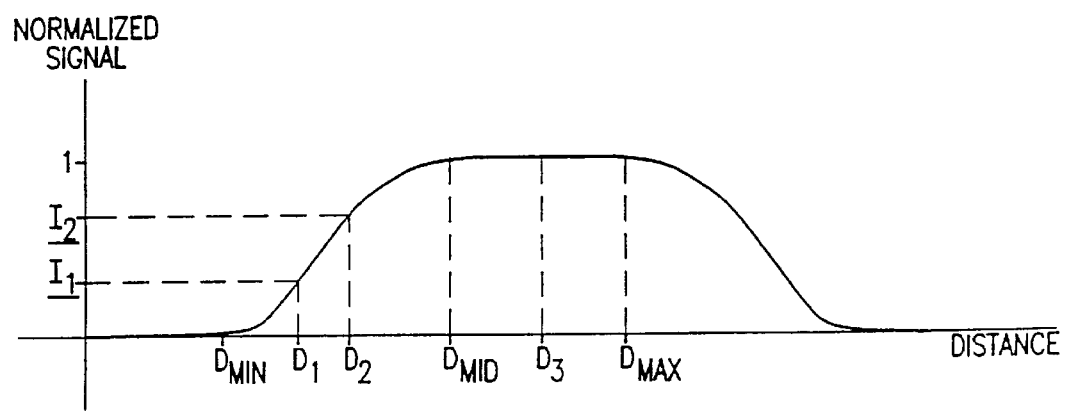
FIG. 6B is a schematic illustration of a distance-dependent image filtering function, obtained by applying the waveforms shown in FIG. 6A to the camera of FIG. 1 or 2B.

FIG. 6B illustrates schematically the normalized signal strengths $I_i$ received from objects 72, 74 and 76, as shown in FIG. 4, when camera 20 operates in accordance with the waveforms of FIG. 6A. The normalized signal for objects at distances less than $D_{min}$ is substantially equal to zero, as described above. For objects at distances greater than $D_{mid}$ and up to $D_{max}$, such as object 76 at distance $D_3$, the normalized signal is substantially equal to 1. $D_{mid}$ is largely dependent on $T_{62}$ and on the rise times of waveforms 60 and 62. $D_{max}$ is largely dependent on the sum of times $\tau$ and $T_{60}$. Preferably, $D_{max}$ is chosen to be greater than the distance from camera 20 of the most distant object of significance in the scene. Alternatively or additionally, $D_{max}$ may be chosen so that $D_{max}$>c/f, where as noted earlier, c is the speed of light and f is the field or frame rate of camera 20, so that all objects at distances greater than $D_{mid}$ will give normalized signals substantially equal to 1.

Thus, within a distance range of interest between $D_{min}$ and $D_{mid}$, the normalized signal is a monotonically-increasing function, based on which the respective distances $D_1$ and $D_2$ of objects 72 and 74 are determined in accordance with the principles of the present invention. Objects at distances outside this range are preferably ignored. The range may be increased or decreased by varying $T_{62}$. It will be appreciated that for objects within the range of interest, each value of the normalized signal corresponds to a unique distance, unlike the function shown in FIG. 5, in which a given value of the normalized signal between 0 and 1 corresponds to two different object distances. In the scheme of FIG. 5, these two distances must then generally be distinguished one from another by other means, for example by comparing results obtained using different distance windows.

FIG. 7 shows a preferred embodiment of the present invention, in which camera 20 acquires three-dimensional image information from distance window 78 within scene 70, wherein the center distance and the width of the window are adaptively controlled. Preferably, camera 20 initially receives two-dimensional image data while modulators 34 and 44 operate in CW mode, as described above. The image data are received by an image analyzer 80, which identifies objects within scene 70 and presents a video image to an operator via an operator console 82 and an associated video display 84. Image analyzer 80 and operator console 82 preferably comprise one or more digital computers, adapted for image processing, as known in the art. The operator identifies at least one object of interest, say object 72, within scene 70, preferably by using a trackball, mouse or other pointing input device known in the art, associated with operator console 82, to point to and indicate the object to image analyzer 80 and/or to a separate system controller 86.

Once the object of interest has been identified, system controller 86 acquires an initial range reading regarding object 72. As shown in FIG. 7, this initial range reading may be acquired by aiming a range finder 88 known in the art, for example a laser range finger, at object 72 and receiving a range reading therefrom. The initial range reading is used by system controller 86 to determine appropriate values of $\tau$ and T to produce the desired distance window, preferably centered at the distance of object 72.

In alternative preferred embodiments of the present invention, system controller 86 acquires an initial range reading without the use of range finder 88. Preferably, modulators 34 and 44 are controlled, by means of controller 46, to provide a wide window, using a relatively large value of T, centered at an estimated distance of object 72. If the distance of object 72 cannot be conveniently estimated, $\tau$ may be scanned over a range of values to generate a plurality of windows at different distances, until the initial range is found. Thereafter, T is preferably reduced, so that the window is more closely confined to a range of distances including object 72 and any other objects of interest, so that the distances to these objects may be determined with optimal accuracy and reduced image clutter, as described above.

Although in the preferred embodiments described above, the objects of interest are initially identified interactively, by the operator, in other preferred embodiments of the present invention, image analyzer 80 may identify objects of interest autonomously, based on pre-programmed image attributes. For example, the image analyzer may be programmed to identify vehicles, people or structures, using methods of image analysis and/or automatic target recognition known in the art. These identifications are conveyed to system controller 86, which then controls rangefinder 88 and/or camera 20 to track and determine distances to the identified objects.

However the at least one object of interest is identified and its initial range found, thereafter image analyzer 80 preferably continues to track the object and its distance from camera 20. System controller 86 adaptively varies $\tau$ and T so as to maintain window 78 at the desired width, substantially centered on the object.

Figure 8:
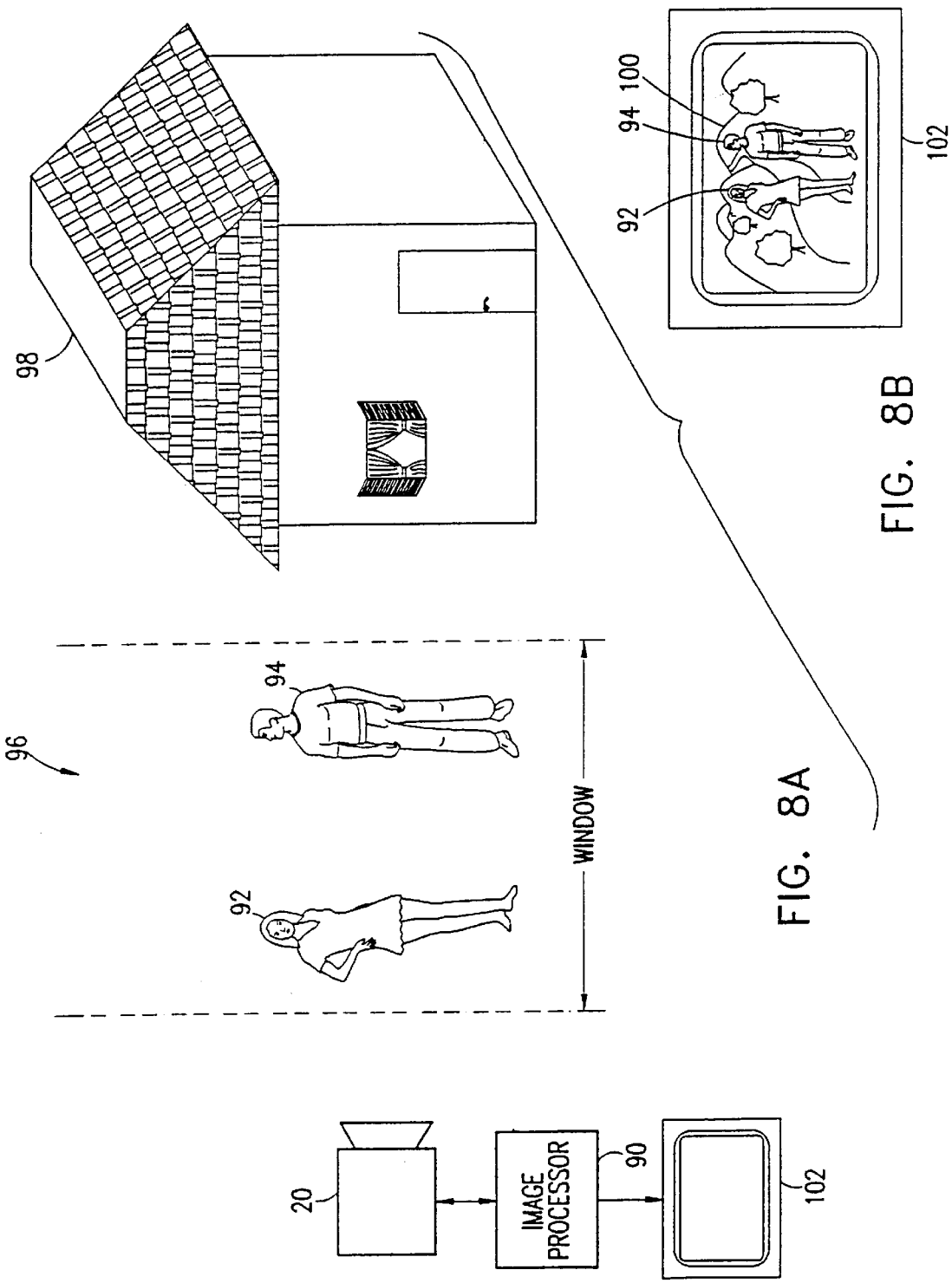
FIG. 8A is a schematic illustration of an optical ranging camera system for producing mixed video images, in accordance with a preferred embodiment of the present invention.
FIG. 8B is a schematic illustration of a video image produced by the system of FIG. 8A.

FIGS. 8A and 8B illustrate schematically a preferred embodiment of the present invention, in which camera 20 is used in conjunction with an image processor 90, known in the art, to create a desired mixed image.

Mixed images are commonly used in entertainment, for example in news broadcasts, to artificially insert an object of interest, typically a person, whose image is acquired by a video camera, in front of a separately-acquired background. An image of the person or other object of interest must generally be acquired against a background of a known, predetermined color, typically blue. After the image of the person or other object of interest is acquired, it is chroma-keyed, i.e., all pixels in the image of the predetermined color are identified, and the separately-acquired background image is substituted pixel-for-pixel at the color-identified pixels. This chroma-keying method requires that a backdrop of the predetermined color be fixed behind the person or other objects of interest, and that the person or other objects of interest include substantially none of the predetermined color.

As shown in FIG. 8A, however, camera 20 is able to selectively acquire images of persons 92 and 94 within a window 96, while a more distant building 98 is excluded from the acquired image. Preferably, $\tau$ and T are adjusted so that the normalized signals produced by array 22 in response to the images of persons 92 and 94 are substantially equal, despite the fact that person 94 is located farther from camera 20 than person 92. Such equalization of the normalized signals is helpful in making a more accurate determination of the distance to person 94, and may also be useful in producing an image that is more pleasing to the eye, due to clearer reproduction of both persons 92 and 94.

As illustrated in FIG. 8B, image processor 90 receives the selectively-acquired image from camera 20 and mixes it with a background 100 to produce a desired, combined video image on monitor 102, or similarly, to record and/or transmit such a combined video image. No fixed backdrop or chroma-keying is required. Background 100 may be a real, separately-acquired image, or alternatively, a synthetic, computer-generated image or a combination of real and synthetic images.

Figure 9:
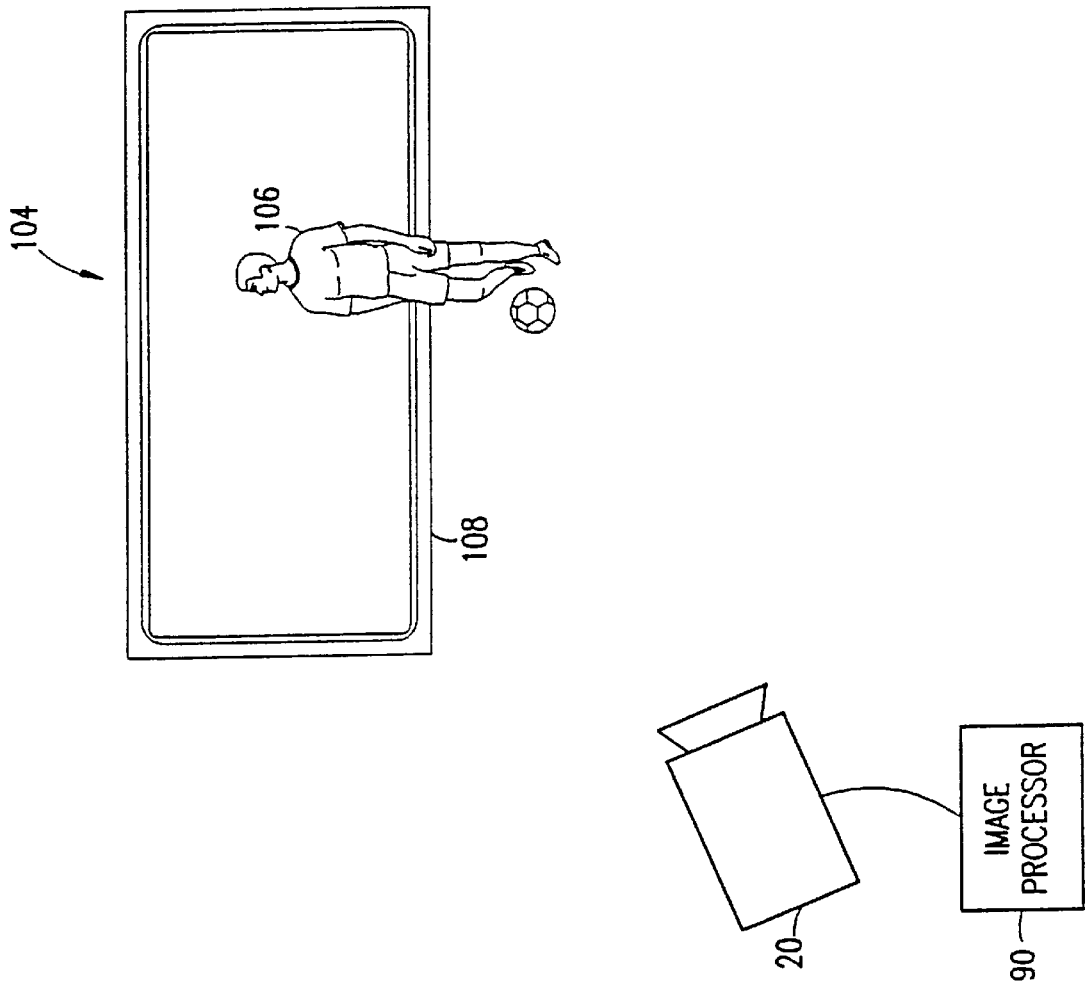
FIG. 9 is a schematic illustration of an optical ranging camera system for producing mixed video images, in accordance with another preferred embodiment of the present invention.

FIG. 9 illustrates schematically another preferred embodiment of the present invention, in which camera 20 and image processor 90 are used in conjunction with a billboard 104 to produce a mixed image in which a desired picture, for example an advertising message, is artificially placed inside the image of the billboard. Such preferred embodiments could preferably be used in international sports broadcasts, for example, to introduce audience-specific advertisements in different countries.

Thus, as illustrated in the figure, camera 20 captures an image including subject 106 and billboard 104, and determines the respective distances to the subject and the billboard, as described above. Image processor 90 additionally identifies boundary 108 of billboard 104 and determines the position and orientation of the billboard relative to camera 20, using image analysis methods known in the art. Boundary 108 preferably includes an easily identifiable feature, for example a retroreflective strip, a strip of infrared-reflecting material or a row of infrared LED's or other lights. Alternatively, billboard 104 may be chroma-keyed, so as to aid image processor 90 in accurately determining the position and orientation. The image processor then inserts a desired image or message into billboard 104 in the image received from camera 20, after appropriately adjusting the size and virtual viewing angle of the image or message. The image of subject 106 is superimposed on the image or message in the billboard.

Figure 10:
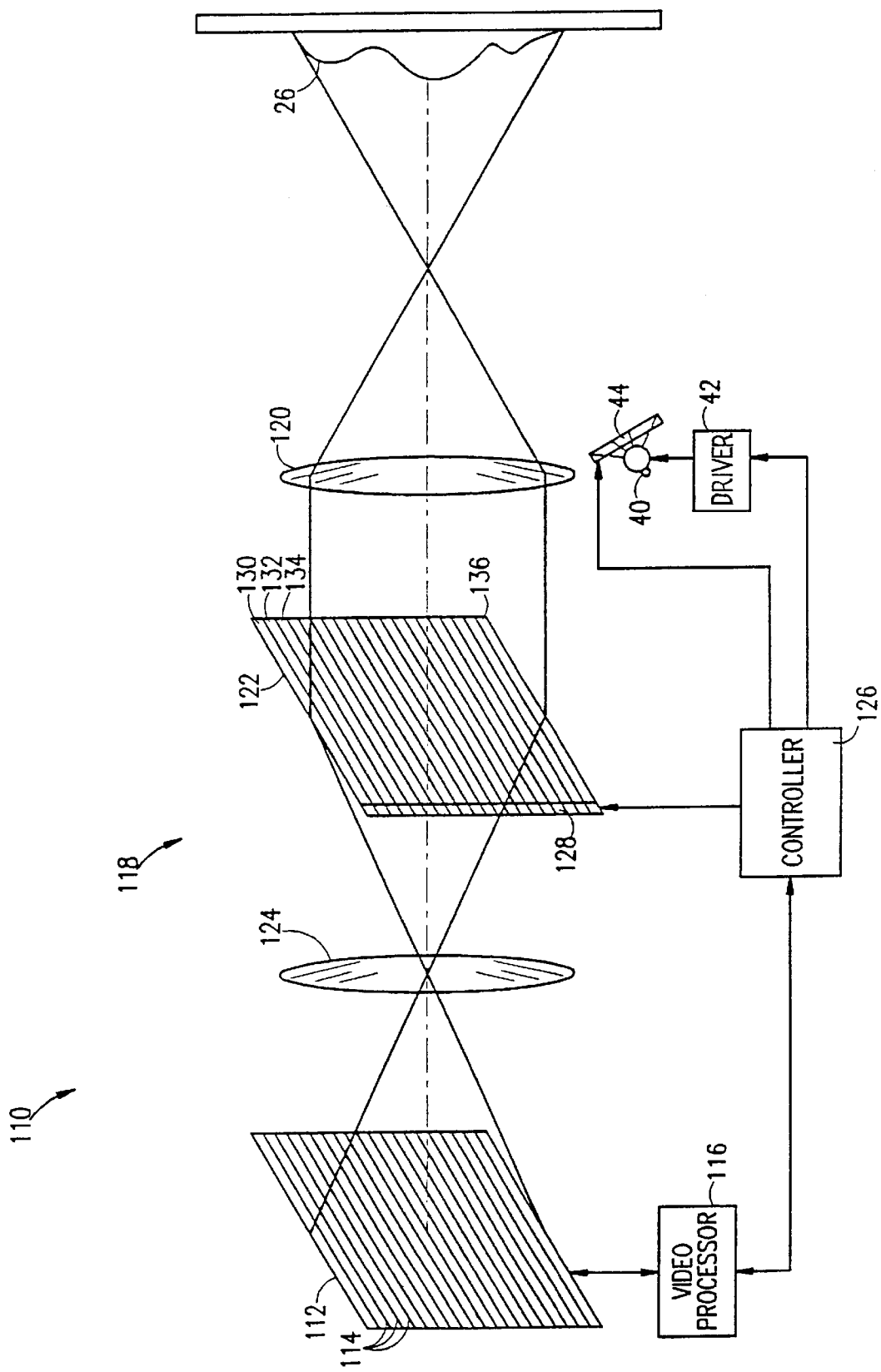
FIG. 10 is a schematic illustration of an optical ranging line-imaging camera, in accordance with a preferred embodiment of the present invention.

FIG. 10 is a schematic representation of a ranging, line-imaging camera 110 in accordance with another preferred embodiment of the present invention. Camera 110 may be used in a manner analogous to linear-array imaging devices known in the art, such as linear-array CCD cameras and scanners. Such a device generally produces an image (without depth information) of a narrow, linear portion of an object or scene. The device's field of view is then swept optically or mechanically over the object or scene, and the multiple images thus produced are combined to form a single, two-dimensional image. As will be described below, the field-of-view of ranging, line-imaging camera 110 is, preferably, similarly swept over an object or scene to form an image including three-dimensional information.

As shown in FIG. 10, camera 110 comprises a detector matrix array 112, which is preferably a CCD array, similar to array 22 in camera 20. Array 112 comprises a plurality of parallel rows 114 of detector elements. A video processor 116 provides driver signals to array 112 and receives image-responsive video signals therefrom. Like camera 20, line-imaging camera 110 is shown forming an image of scene 26, which is illuminated by light source 40, driven by driven circuitry 42, via modulator 44.

Optical assembly 118 in camera 110 comprises a collecting lens 120, a linear shutter array 122 and an imaging lens 124. Shutter array 122 comprises a plurality of long, narrow shutter elements 130, 132, 134, . . . 136, and is preferably positioned in a plane substantially parallel to the plane of detector array 112, with elements 130–136 oriented in a direction substantially parallel to rows 114. A controller 126 controls linear shutter array 122 by means of an integral switching network 128, which is preferably controlled by controller 126 to open each of shutter elements 130–136 according to a desired sequence. Controller 126 additionally controls driver circuitry 42 and modulator 44, as described above in reference to controller 46 in camera 20, and controls and receives data from video processor 116.

Preferably, shutter array 122 is a liquid crystal shutter array or, alternatively, an array of gated microchannel elements or of electro-optical or acousto-optical modulator elements.

Figure 11:
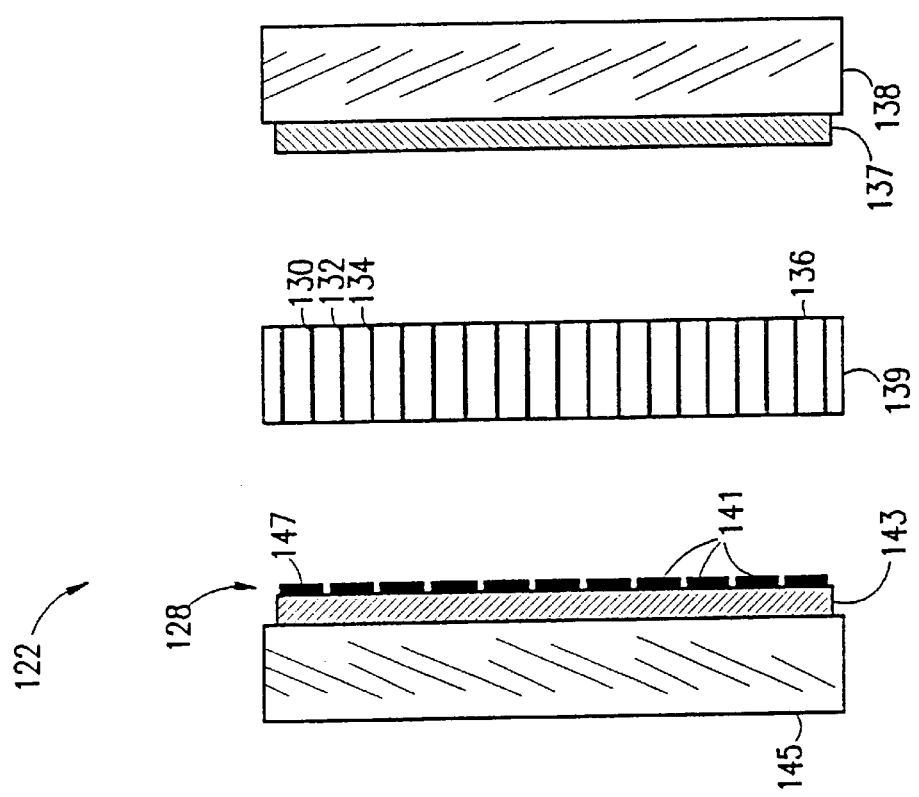
FIG. 11 is a schematic, exploded, sectional illustration of a shutter array, preferably for use in the camera of FIG. 10, in accordance with a preferred embodiment of the present invention.

FIG. 11, for example, illustrates a preferred embodiment of the present invention, wherein shutter array 122 comprises a gated microchannel array, shown in a partially exploded, sectional view. Array 122 comprises a photoanode 137, coated on a first glass plate 138; a microchannel plate 139; and a photocathode 143 coated on a second glass plate 145, with integral switching network 128 superimposed thereon. Photoanode 137 and photocathode 143 may comprise any suitable materials known in the art, for example phosphorus. Switching network 128 preferably comprises a plurality of conductive, transparent electrodes 141, for example stripes of ITO (indium tin oxide) coated onto the surface of photocathode 143. It will be understood that although for clarity of illustration, glass plates 138 and 145 and microchannel plate 139 are shown separated in the figure, in practical use these elements are generally held close together, within an evacuated casing, as is known in the art.

Microchannel plate 139 is preferably similar to conventional microchannel plates known in the art, but differs in that different groups of microchannels within the plate, constituting shutter elements 130, 132, 134 . . . 136, are individually switched, or gated, by corresponding electrodes 141. The electrodes are individually switchably connected through network 128 to a source of negative high voltage, known in the art, preferably in the range of −200 VDC.

The operation of shutter array 122, as shown in FIG. 11, will be understood from the following example. Photons striking photoanode 137 generate photoelectrons adjacent to microchannel plate 139. When one of the electrodes 147, corresponding to element 130, is connected to the negative high voltage, photoelectrons generated in the region adjacent to element 130 are accelerated through the microchannels in plate 139 that constitute element 130, and further generate secondary electrons in the microchannels, as is known in the art. These electrons then pass through electrode 147 and strike photocathode 143, thereby generating photons in the region of the cathode adjacent to element 130. Assuming that the remaining electrodes 141 are not connected to the negative high voltage, however, this process will not take place substantially at any of the other elements 132, 134 . . . 136. Thus, shutter element 130 is effectively open, while the remaining shutter elements are effectively closed. Shutter elements 132, 134 . . . 136 are preferably opened sequentially in like manner, following element 130.

Collecting lens 120 images light reflected from scene 26 onto shutter array 122, which modulates the light as will be described below. The modulated light from the shutter array is then focused by imaging lens 124 onto detector array 112. Preferably, optical assembly 118 is constructed and aligned so that each element 130–136 in shutter array 122 is imaged onto one row 114 of detector array 112 or, alternatively, onto a group of adjacent rows 114, depending on the number and size of elements 130–136 compared to the number and size of rows 114. Although in FIG. 10, imaging lens 124 is shown to be imaging shutter array 122 onto detector array 112 at approximately unit magnification, it will be appreciated that any suitable magnification may be chosen by appropriate selection and alignment of imaging lens 124, depending on the relative dimensions of shutter array 122 and detector array 112 and of their respective elements 130–136 and rows 114. Moreover, if the dimensions of shutter array 122 and shutter elements 130–136 can be made small enough to match the dimensions of detector array 122 and rows 114, shutter array 122 may be positioned directly adjacent to detector array 112 and coupled thereto by direct contact, thus obviating the need for intervening imaging lens 124 and simplifying optical assembly 118.

Figure 12A:
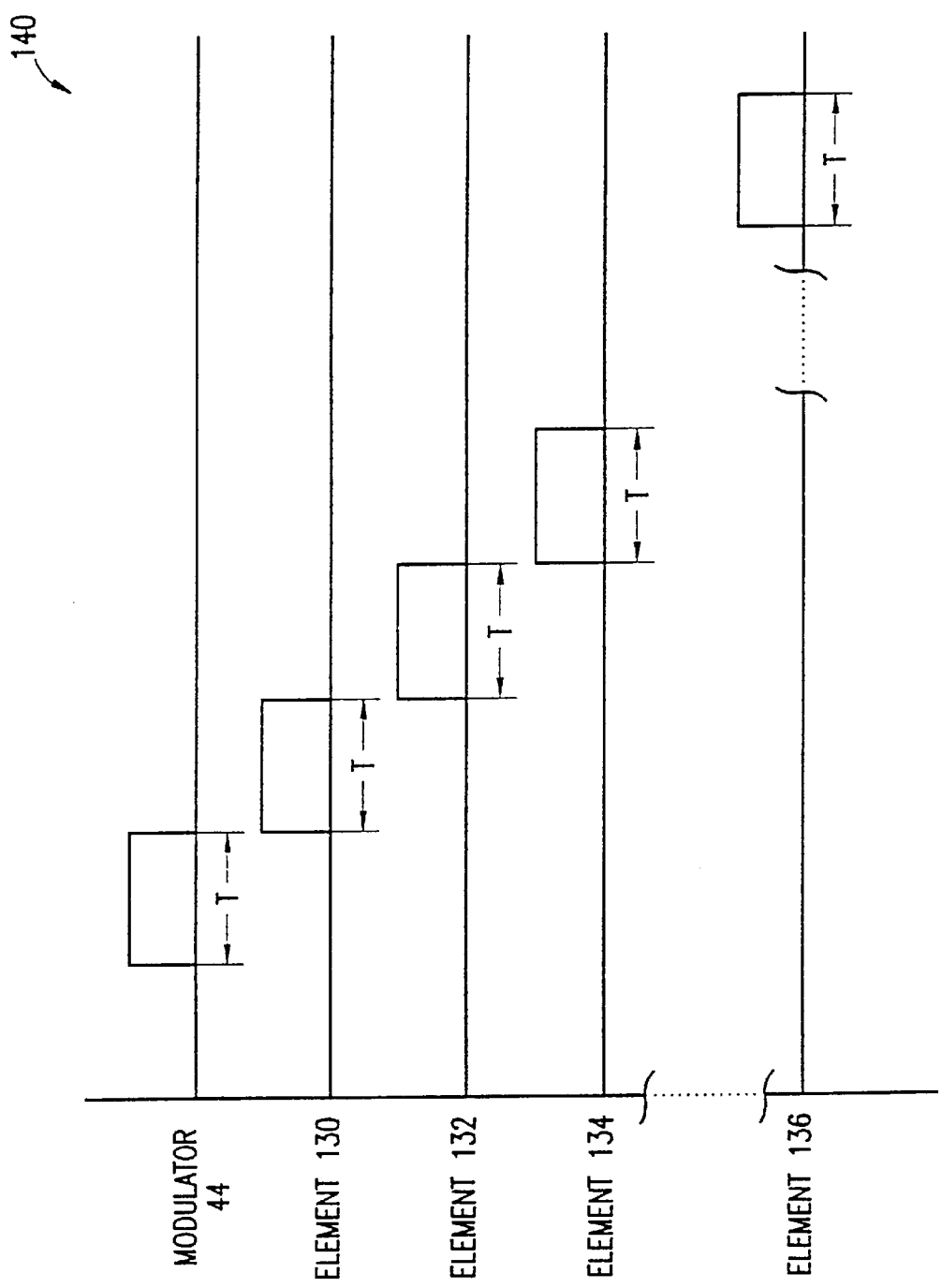
FIG. 12A is a schematic diagram showing waveforms illustrative of a modulation scheme for use in conjunction with the camera of FIG. 10, in accordance with a preferred embodiment of the present invention.

FIG. 12A is a timing diagram, which illustrates schematically switching and modulation pulses 140 applied to modulator 44 and shutter array 122 in camera 110, in accordance with a preferred embodiment of the present invention. Modulator 44 and shutter element 130 are initially opened, allowing light to pass therethrough, by a rectangular pulse waveform of duration T. As modulator 44 and element 130 close, a substantially identical modulation waveform is applied to element 132. As element 132 closes, element 134 opens, and so on in sequence down array 122 until the final element 136 is opened. As noted above, as each of shutter elements 130–136 opens, a corresponding row 114 or group of rows of detector array 112 are exposed to light reflected from scene 26.

Figure 12B:
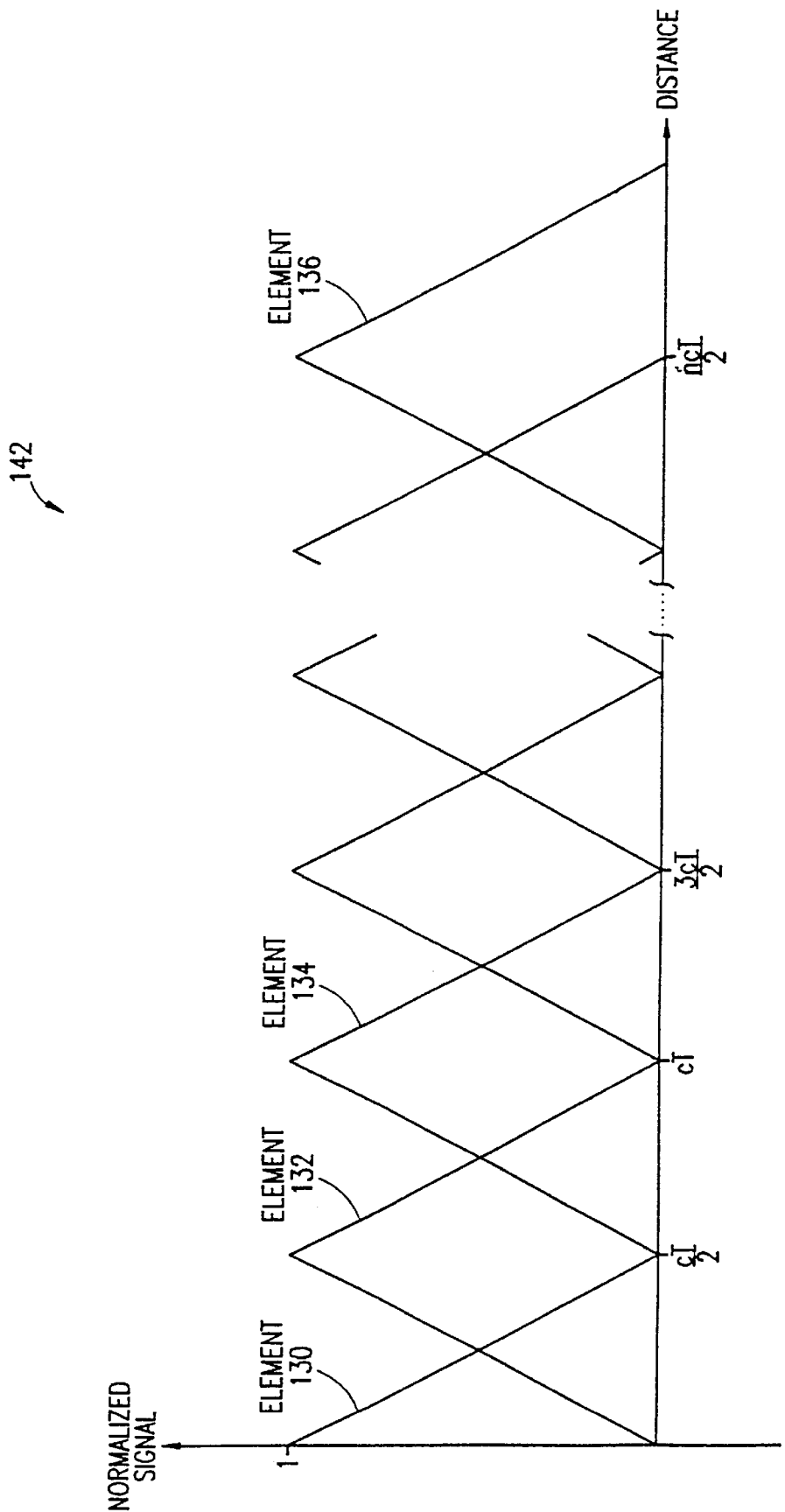
FIG. 12B is a schematic illustration of a sequence of distance-dependent image filtering functions, obtained by applying the waveforms shown in FIG. 11A to the camera of FIG. 10, in accordance with a preferred embodiment of the present invention.

As shown in FIG. 12B, modulation pattern 140 shown in FIG. 12A causes a series of successive, overlapping distance windows 142 to be defined by shutter elements 130–136. Each row 114 or group of rows of detector array 112 receives light only from objects in scene 26 located within the window defined by its corresponding shutter element 130–136. The widths of windows 142 and their respective center distances, as well as the normalized signal strengths, are determined as described above with reference to FIGS. 3, 4 and 5 or, alternatively, 6A and 6B. The mutual overlap of distance windows 142 may be used to resolve the problem of distance ambiguity that is encountered when an object of interest is contained only in a single distance window, for example according to the scheme of FIG. 5.

It will be appreciated that modulation pattern 140 and the resultant windows 142 are shown here by way of example, and any other suitable modulation pattern may similarly be used. For example, the modulation waveforms applied to modulator 44 may be similar to waveform 60 shown in FIG. 6A and described above with reference to the figure. The waveforms applied to shutter elements 130–136 may be similar in form to waveform 62 in FIG. 6A and applied sequentially, generally as shown in FIG. 12A. In this case, a series of overlapping distance windows will be defined, similar in form to that shown in FIG. 6B.

Furthermore, it will be appreciated that the modulation pulses applied to successive shutter elements 130–136 may be timed to overlap, so that the corresponding distance windows have greater overlap with their respective neighbors. Alternatively, a delay may be introduced between the modulation pulses so as to spread the distance windows apart. Furthermore, the waveforms applied to successive shutter elements 130–136 need not all have equal duration periods, but may for example have periods that increase from element to element, moving down the array, so that at greater distance from camera 110, the distance windows are wider.

It will be appreciated that each image frame captured by line-imaging camera 110 comprises an array of image slices. Each image slice is laterally substantially contiguous with its neighbors, but captures objects within a different distance window. Thus, an object that is on the border between two image slices will generally have different levels of normalized intensity in the two slices, or it may appear partially in one of the two slices, but not in the other. Therefore, as was mentioned earlier by analogy with conventional linear array imaging devices known in the art, in preferred embodiments of the present invention, the image slices are optically or mechanically swept across a scene, so that each object of interest in the scene is captured in at least one image slice that has a distance window in which the object of the interest is included.

Figure 13:
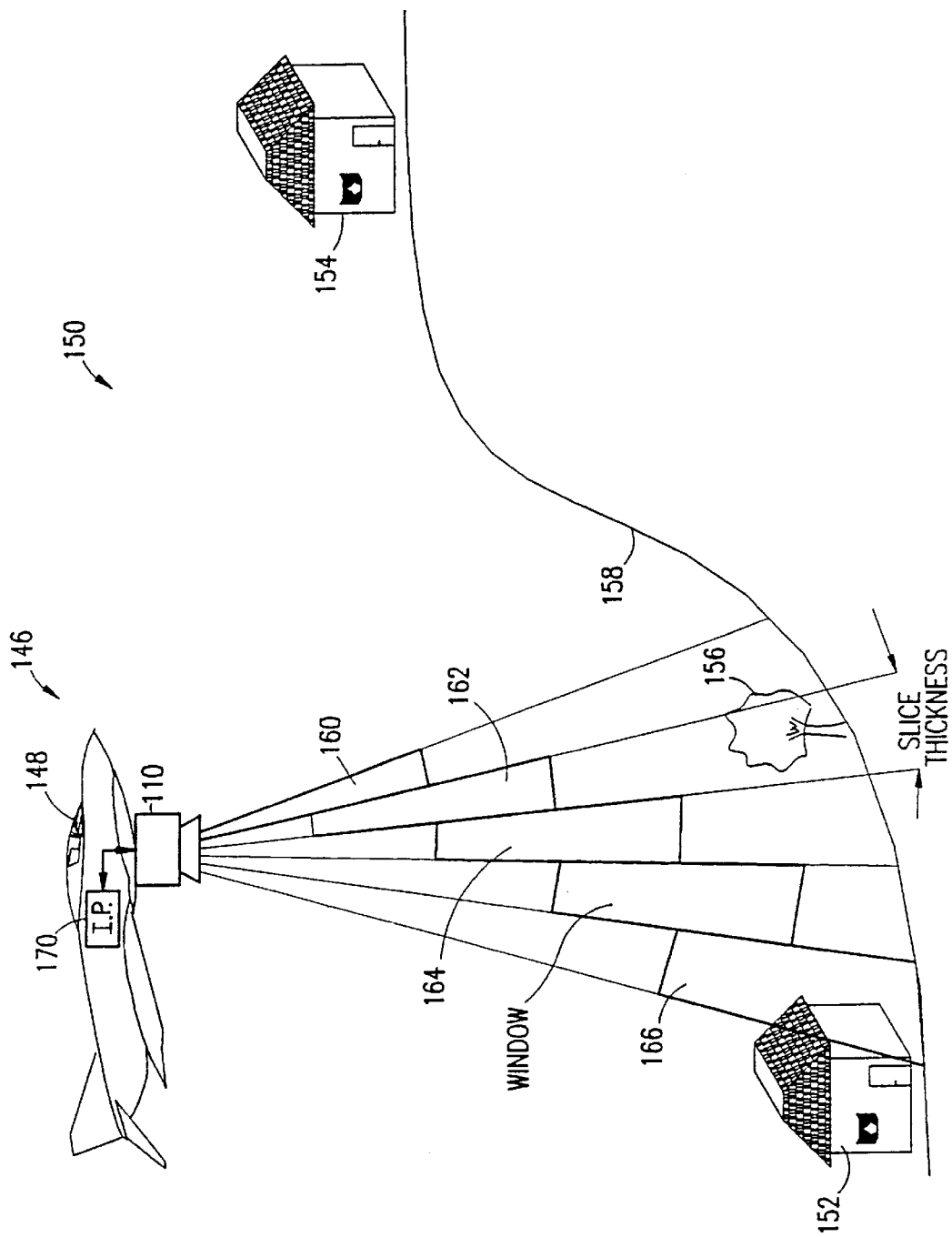
FIG. 13 is a schematic illustration of a topographical imaging system, based on the line-imaging camera of FIG. 10, in accordance with a preferred embodiment of the present invention.

FIG. 13 illustrates schematically the use of line-imaging camera 110 in an airborne system 146 for three-dimensional reconnaissance imaging. System 146 comprises camera 110, which is mounted looking downward from an aircraft 148 and oriented so that the long dimension of shutter elements 130–136 is substantially perpendicular to the aircraft's direction of flight. Camera 110 captures images of a scene 150 that may typically include buildings 152 and 154, vegetation 156 and a topographical feature 158.

As illustrated in FIG. 13, each shutter element 130, 132, 134, . . . 136 in array 122 defines a respective image slice 160, 162, 164, . . . 166. The slices preferably have substantially equal angular extents, or slice thicknesses, defined by the heights of the shutter elements in array 122, and distance windows of substantially equal depth, as shown, for example, in FIG. 12B. For clarity of illustration, FIG. 13 includes only a small number of slices, although in practice any number of slices, up to the number of rows 114 in array 112, could be used.

As aircraft 148 flies over scene 150, slices 160–166 sweep over the scene in "push-broom" fashion, so that each slice captures, line-by-line, a full two-dimensional image of objects in the scene that are within its respective distance window. The distance from camera 110 to each object within the window of any one of the slices, for example, building 152 in slice 166, is determined precisely from its normalized signal strength, as described above. If desired, the distance windows may be adaptively adjusted to accommodate variations in elevation within the scene, such as the slope of topographical features 158. Preferably, the altitude and groundspeed of aircraft 148 are known and controlled, most preferably constant, so that an image processor 170, which receives the line images from camera 110, can assemble the line images and distance information together into a full, three-dimensional image of scene 150.

Further preferably, array detector 112 is scanned at a rate that is synchronized with the groundspeed, so that an area of the scene captured in slice 160 in one field or frame acquired by camera 110 is captured by slice 162 in the subsequent field or frame, for example. Thus, video processor 194 or an associated image acquisition system can conveniently and accurately register the multiple slices and corresponding depth windows.

In some preferred embodiments of the present invention, the line images and distance information acquired by camera 110 are used in three-dimensional photogrammetry, to determine the lateral dimensions and elevations of image features, such as buildings 152 and 154 and topographical feature 158. These dimensions and elevations may be then be incorporated, for example, into accurate topographical maps and land surveys. They may similarly be used to calculate the volume of a feature, such as building 152, for example, which is normally very difficult to derive with accuracy from conventional photographs or video images.

It will be appreciated that although FIG. 13 shows camera 110 mounted on aircraft 148, other, similar preferred embodiments of the present invention may be described wherein the camera is mounted on other types of airborne platforms or alternatively, space-borne or seaborne platforms. For example, the camera may be mounted to a sea surface vessel or an undersea vessel to map underwater or sea-bottom features.

Figure 14:
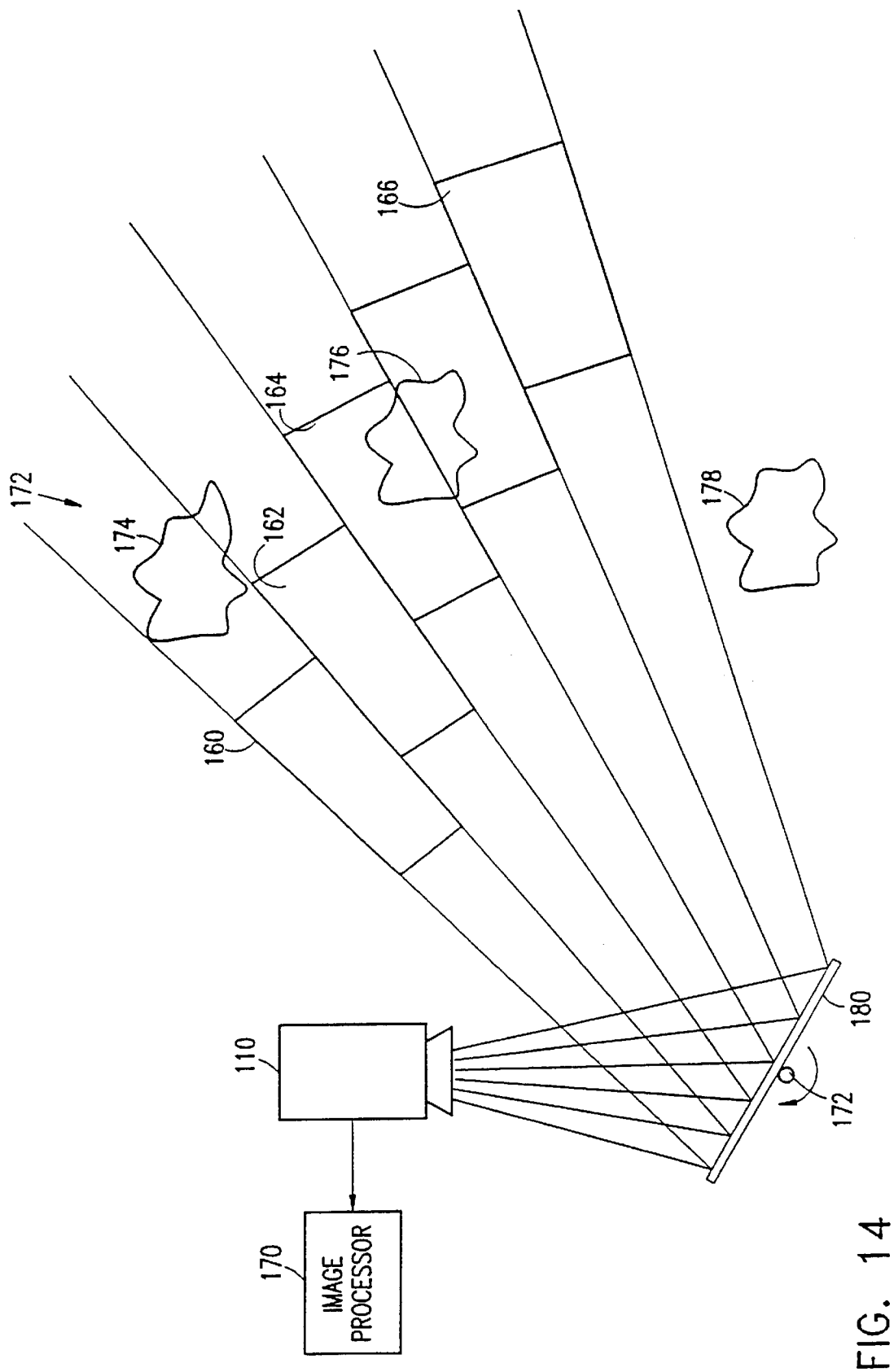
FIG. 14 is a schematic illustration of an image scanning system, based on the line-imaging camera of FIG. 10, in accordance with another preferred embodiment of the present invention.

FIG. 14 shows schematically an alternative preferred embodiment of the present invention, in which camera 110 is mounted in a stationary fashion and produces multiple line-image slices 160–166 of a scene 172, including distance information regarding objects 174, 176 and 178. A mirror 180, mounted on a rotating shaft 182, scans the line images across scene 172, so that image processor 170 can acquire a full, three-dimensional image of the scene, in a manner similar to that described above with regard to FIG. 13. Shaft 182 is preferably rotated by a galvanometer, polygon scanner or other means known in the art.

Figure 15:
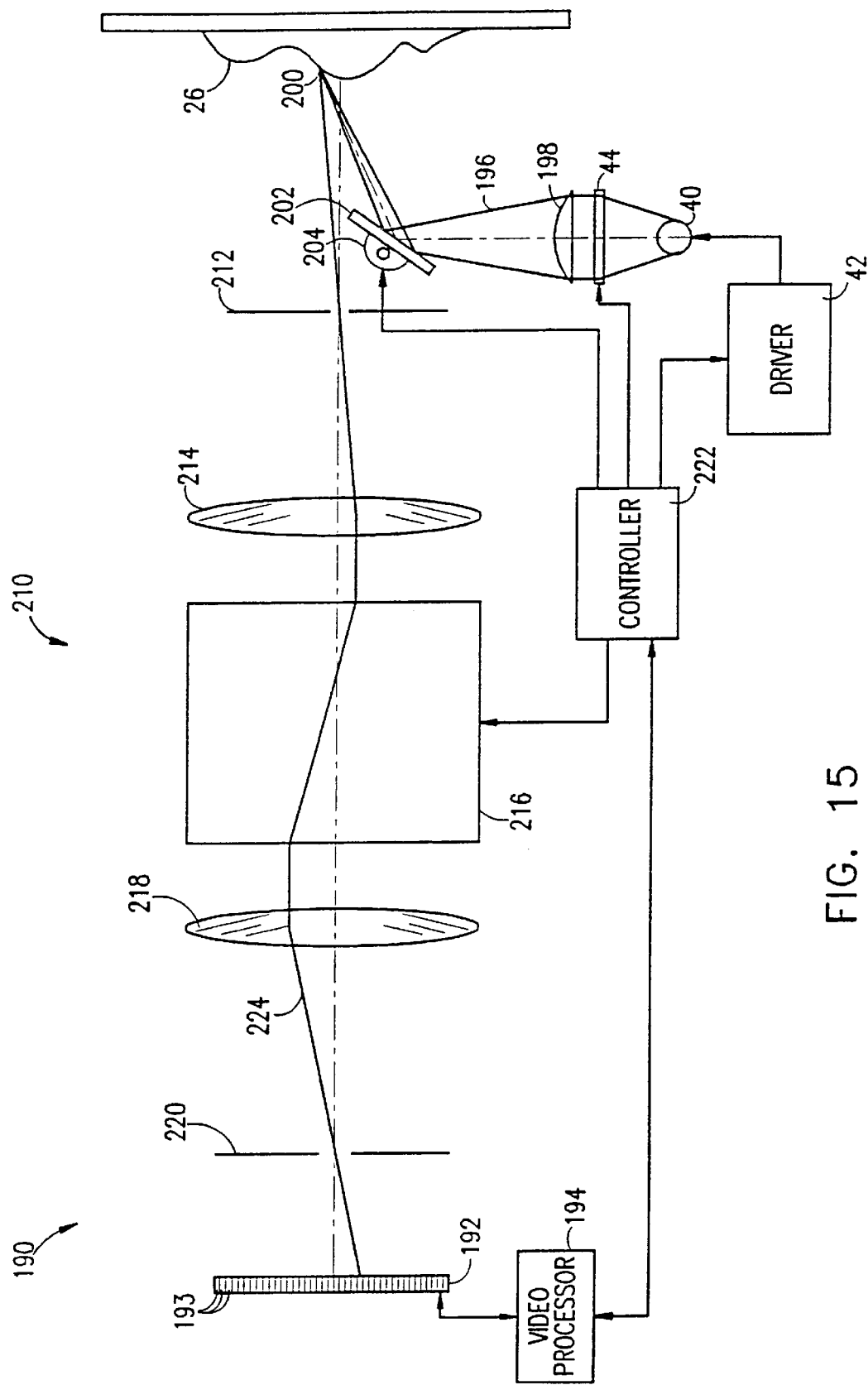
FIG. 15 is a schematic illustration of an optical ranging line-imaging camera, in accordance with another preferred embodiment of the present invention.

FIG. 15 shows still another preferred embodiment of the present invention, in which a line-imaging camera 190 rapidly acquires three-dimensional images of scene 26. Camera 190 comprises a detector array 192, preferably a CCD array, comprising a plurality of rows 193, like array 112 in camera 110, and a video processor 194 coupled to array 192, similar to video processor 116.

As in preferred embodiments described above, light source 40 is driven by driver circuitry 42 to illuminate scene 26, while modulator 44 alternately opens and closes the path of illumination beam 192 in accordance with a desired modulation waveform. Cylindrical lens 198 focuses beam 196, so as to produce a narrow line of illumination 200 on scene 26, wherein the long axis of illumination line 200 is perpendicular to the plane of FIG. 15 and substantially parallel to rows 193 of array 192. A scanning mirror 202 is rotated by a scanning motor 204, for example a galvanometer device known in the art, to sweep line 200 vertically across the extent of scene 26. Such scanning may similarly be accomplished using a polygon mirror, suitably rotated by a servo motor, for example.

Light reflected from scene 26 is collected, scanned and focused onto array 192 by an optical assembly 210. Assembly 210 comprises an entrance iris 212, a collecting lens 214, an optical modulator 216, a focusing lens 218 and an exit iris 220. Modulator 216 preferably comprises an acousto-optical crystal, which is driven by a controller 222 to defect an image beam 224, received from scene 26, so as to scan the beam vertically across array 192. It will be appreciated that image beam 224 comprises a narrow line of reflected light, similar to illumination line 200.

Controller 222 further controls and receives image data from video processor 194, as described with reference to controller 126, shown in FIG. 10, and controls driver 42, modulator 44 and galvanometer 204.

Preferably, as illumination beam 196 is swept vertically across scene 26, modulator 44 opens and closes repeatedly, so that illumination line 200 illuminates a sequence of horizontal slices. For each such slice, modulator 216 preferably scans image beam 224 over substantially all rows 193 of array 192 in sequence, starting from the topmost row and finishing with the bottom row. Thus, image beam 224 dwells on each of rows 193 in succession for substantially equal dwell period, which is functionally equivalent to the duration T of the modulation waveforms shown in FIGS. 3 and 12A. Similarly, as in FIG. 12A, beam 224 reaches each of rows 193 at a delay, relative to illumination beam 196, that is substantially equal to the cumulative dwell periods of the preceding rows of the array.

It will thus be understood that for each slice of scene 26, defined by a position of illumination line 200 at which modulator 44 opens, camera 190 forms a line image of the scene including distance information. The distance information within the slice is captured in a succession of distance windows, each window corresponding to a different row 193 or array 192. As motor 204 and mirror 202 sweep beam 196 over the entire scene 26, camera 190 forms a complete, three-dimensional image of the entire scene.

In an alternative preferred embodiment of the present invention, camera 190 is swept over a scene in a pushbroom mode, for example by fixing the camera to aircraft 148 in place of camera 110, as shown in FIG. 13, or to a moving platform of some other suitable type. In this case, motor 204 is not required, since illumination line 200 is swept across the scene by the motion of the aircraft. Moreover, since all the distance windows acquired in a single field or frame of camera 190 are within the same image slice (unlike camera 110), registration of the individual line images produced by the camera into a combined, three-dimensional image is simplified. Mirror 202 may preferably be replaced by a beam combiner, such as beam combiner 58 shown in FIG. 2, so that illumination beam 196 and reflected beam 224 can be boresighted.

The preferred embodiments of the present invention that have been described above may generally be adapted to produce either monochrome or color images. Monochrome images may be produced using visible, infrared or ultraviolet radiation to illuminate a scene of interest and appropriate optics, modulators and detectors to control and receive the radiation.

Furthermore, the principles of the present invention may be similarly applied to produce three-dimensional images using other types of radiation. For example, acoustical images, such as sonar or ultrasound images, may be produced using an array of acoustical sensors and/or radiators, such as microphones or piezoelectric crystals, as are known in the art, and depth information regarding objects in the images may be determined in accordance with the present invention. For undersea acoustic imaging, acoustic lenses, as are known in the art, may advantageously be used, taking the place of optical lenses 32 and 36 shown in FIGS. 1 and 2A–C.

Figure 16:
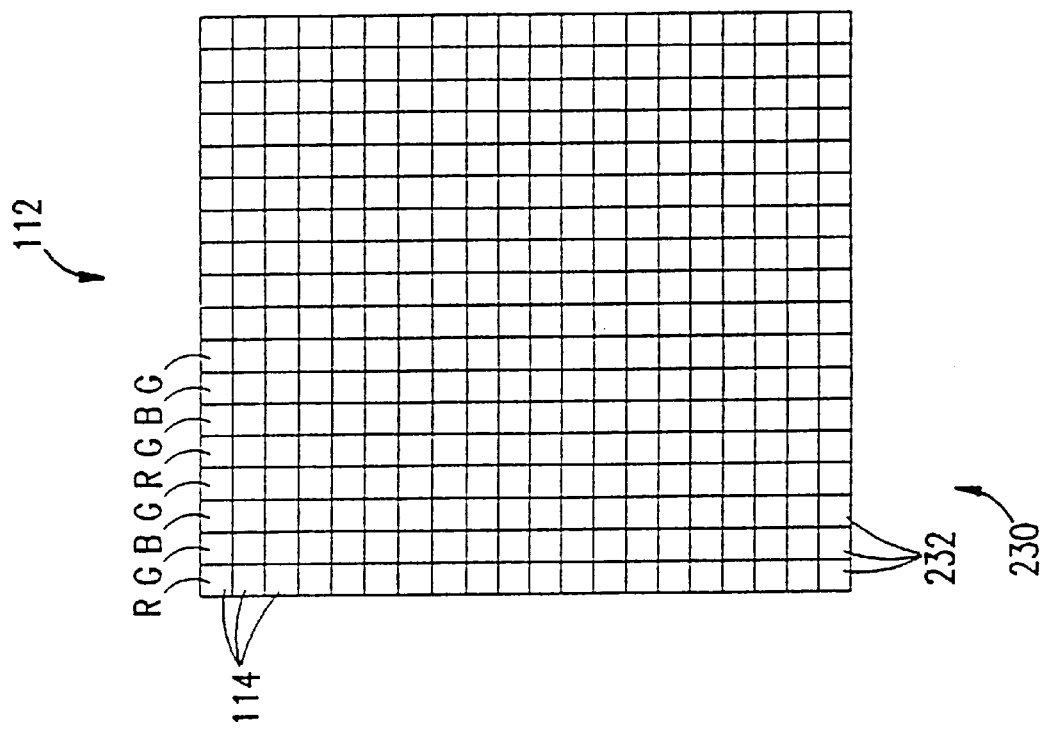
FIG. 16 is a schematic illustration of a color stripe filter, for use together with a detector array in the line-imaging camera of FIG. 10, in accordance with a preferred embodiment of the present invention.

FIG. 16 illustrates an adaptation of detector array 112, for use in camera 110 to produce color images, in accordance with a preferred embodiment of the present invention. Array 112 is overlaid by a color stripe filter 230, comprising a multiplicity of stripes 232, each of which substantially covers a single, respective column of array 112, perpendicular to rows 114. Stripes 232 alternately pass different, respective colors of light, preferably in the order red, green, blue, green, red, green, etc., as is known in the art. Thus, adjacent pixels within a row 114 of array 112 are alternately exposed to red, green or blue light. (Preferably, the light provided by illumination source 40 is white light.) The signals from adjacent pixels are preferably combined to derive local luminance and chrominance information.

Thus, each of the multiple line-images produced by camera 110 will generally include color information, in addition to intensity and depth information. These color line images are then, preferably, scanned and combined, for example as described with reference to FIG. 13 or FIG. 14, to produce three-dimensional color images.

Similarly, detector array 22 in camera 20, shown in FIG. 1, or in camera 50 in FIG. 2A or camera 59 in FIG. 2B, may include a color stripe filter, as shown in FIG. 16, or a color mosaic filter, as known in the art. Alternatively, three CCD detector arrays, with suitable dichroic filters, for example a dichroic prism assembly known in the art, may be substituted for array 22 in camera 20, camera 50, camera 59, or camera 240, described below, in order to generate RGBD (Red-Green-Blue-Depth) images, i.e., color images that include depth information.

Furthermore, in preferred embodiments of the present invention, three-dimensional image information produced by any of the optical ranging cameras described above is fused with and used to enhance the two-dimensional intensity images produced by the camera. Likewise, the two-dimensional intensity images may be used to sharpen or otherwise enhance the three-dimensional images. It will be appreciated that the two- and three-dimensional images are inherently mutually registered, since they originate from the same detector array. Thus, for example, the image information in the two- and three-dimensional images may be combined to sharpen and/or smooth contours due to edges in the images, and/or to correct image colors adjacent to such edges, using image filtering methods known in the art.

Figure 17A:
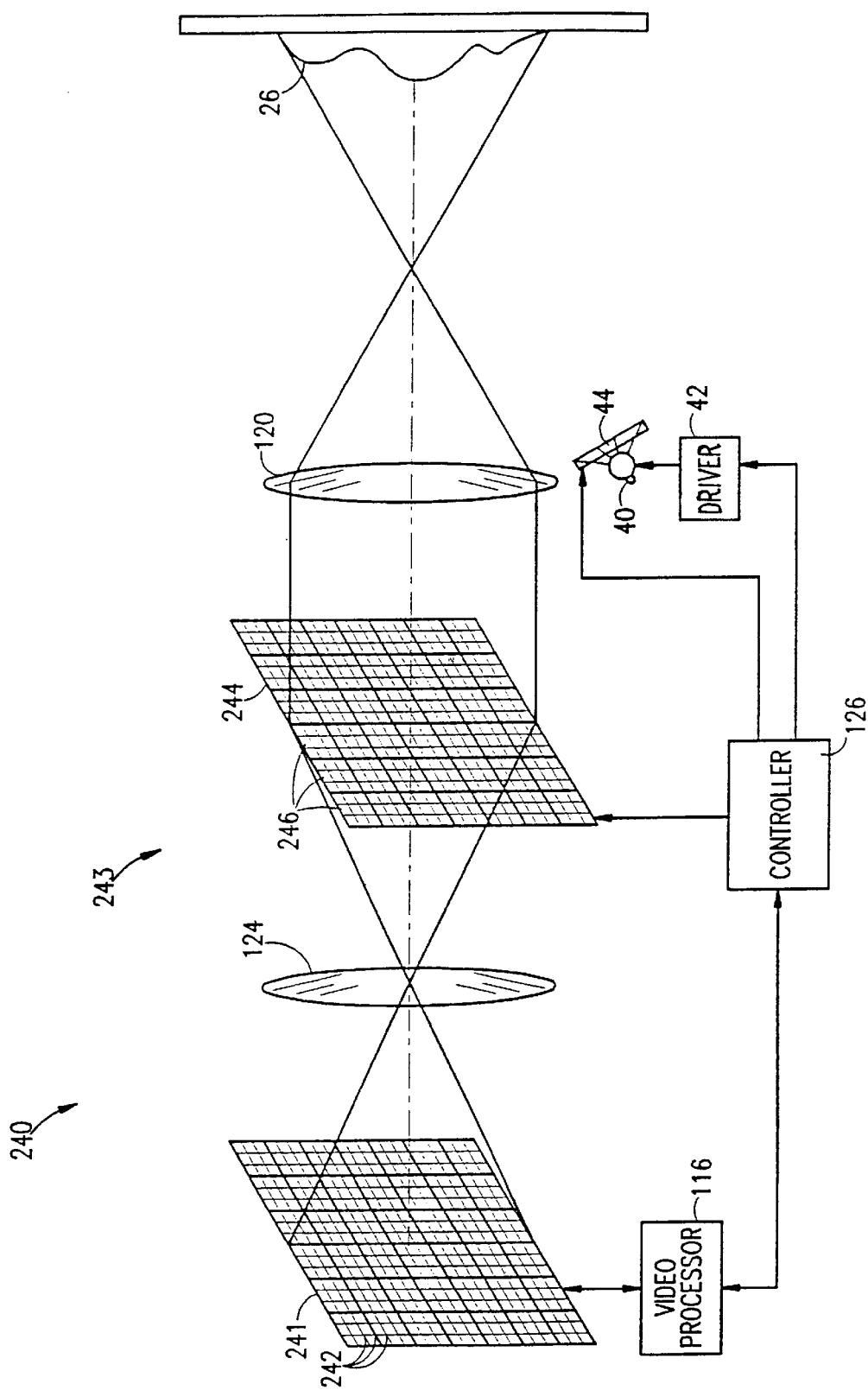
FIG. 17A is a schematic illustration of an optical ranging camera, in accordance with still another preferred embodiment of the present invention.

FIG. 17A schematically illustrates a pixel-wise ranging camera 240, in accordance with still another preferred embodiment of the present invention. Camera 240 includes a detector matrix array 241, comprising a plurality of detector elements 242, similar to array 112 shown in camera 110, as shown in FIG. 10. Camera 240 also includes an optical assembly 243, including a liquid crystal shutter array 244, along with lenses 120 and 124, as in camera 110. Other components of camera 240 shown in FIG. 17A are substantially similar in structure and function to those in camera 110.

Shutter array 244 comprises a plurality of shutter elements 246. Assembly 243 is suitably aligned and positioned relative to detector array 241 so that each shutter element 246 individually modulates the reflected light from scene 26 reaching each detector element 242 or group of adjacent detector elements in array 241. Shutter array 244 is controlled by controller 126, so that different shutter elements 246 may be modulated to open and shut at the same or at different times. Thus, each detector element 242 or group of elements has its own distance window associated therewith, depending on the modulation of the corresponding shutter element.

Shutter array 244 may preferably be operated adaptively, so that each distance window tracks the distance to a point in scene 26 whose image is captured by a respective detector element 242 or group of elements. Each such distance window may be adjusted to contain and to yield accurate readings of the distance to the point, as well as reducing image clutter.

Figure 17B:
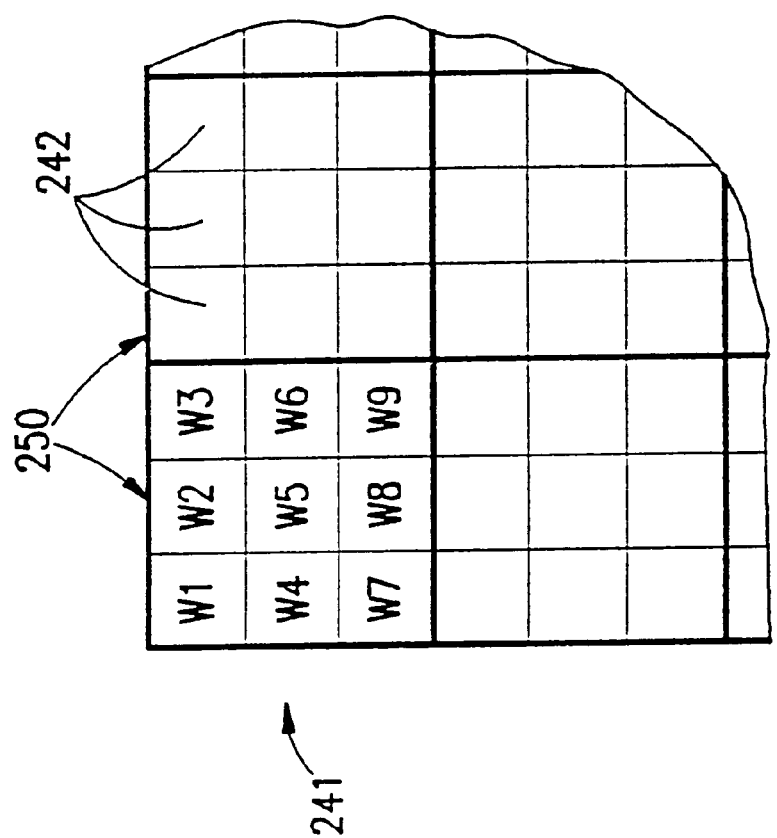
FIG. 17B is a schematic illustration of a portion of a detector array used in the camera of FIG. 17A to produce multiple distance windows, in accordance with a preferred embodiment of the present invention.

As illustrated schematically in FIG. 17B, in some preferred embodiments of the present invention using camera 240, groups of mutually adjacent detector elements 242 in array 241 are organized to operate cooperatively as "super-pixels" 250. Each such super-pixel 250 may include, for example, a three-by-three group of nine elements 242, onto which light reflected from scene 26 is imaged substantially along a common axis by optical assembly 243. Shutter array 244 is operated so that each of the nine elements 242 in super-pixel 250 receives light from a different distance window along the common axis. These windows are labeled W1 through W9 in FIG. 17B, and may correspond, for example, to shutter elements 246 associated with the nine detector elements opening and closing in sequence, in accordance with the modulation waveforms illustrated in FIG. 12A.

In this manner, a complete image of the scene is captured in a single field or frame of camera 240, including depth information with a desired degree of distance resolution, although at the expense of lateral resolution. Super-pixels of any desired size, for example 1×2 pixels, 2×2 pixels or 4×4 pixels, may be used to achieve optimal coverage of object distances in the scene.

Figure 18:
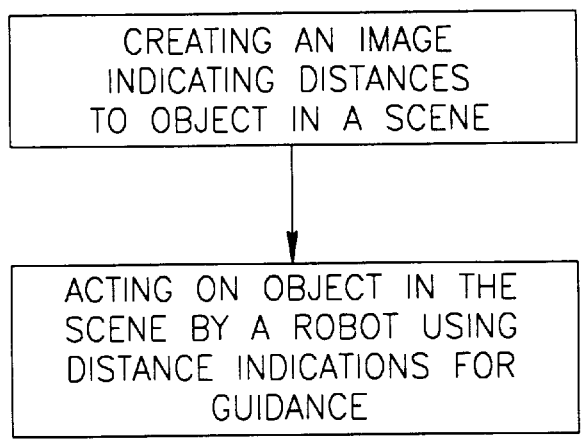
FIGS. 18–20 are simplified flow charts illustrating various operations involved in preferred applications of the invention, utilizing cameras according to the invention.

In some preferred embodiments of the present invention, a ranging camera as described above, for example camera 20, is mounted on or otherwise associated with a robot, which uses the three-dimensional image information provided by the camera to guide its action in a desired task. A flow chart outlining these preferred embodiments of the invention is shown on FIG. 18.

In other preferred embodiments of the present invention, camera 20, 50 or 110 is used in quality assurance or quality control of a manufacturing process, for example to determine multiple dimensions of an article of manufacture and verify its compliance with a standard. Similarly, by measuring surface contours of a bulk material, the volume of the material may be determined. The volume of goods stored in a container, whose size is likewise known or measured using the camera, may be determined in like manner.

Figure 19:
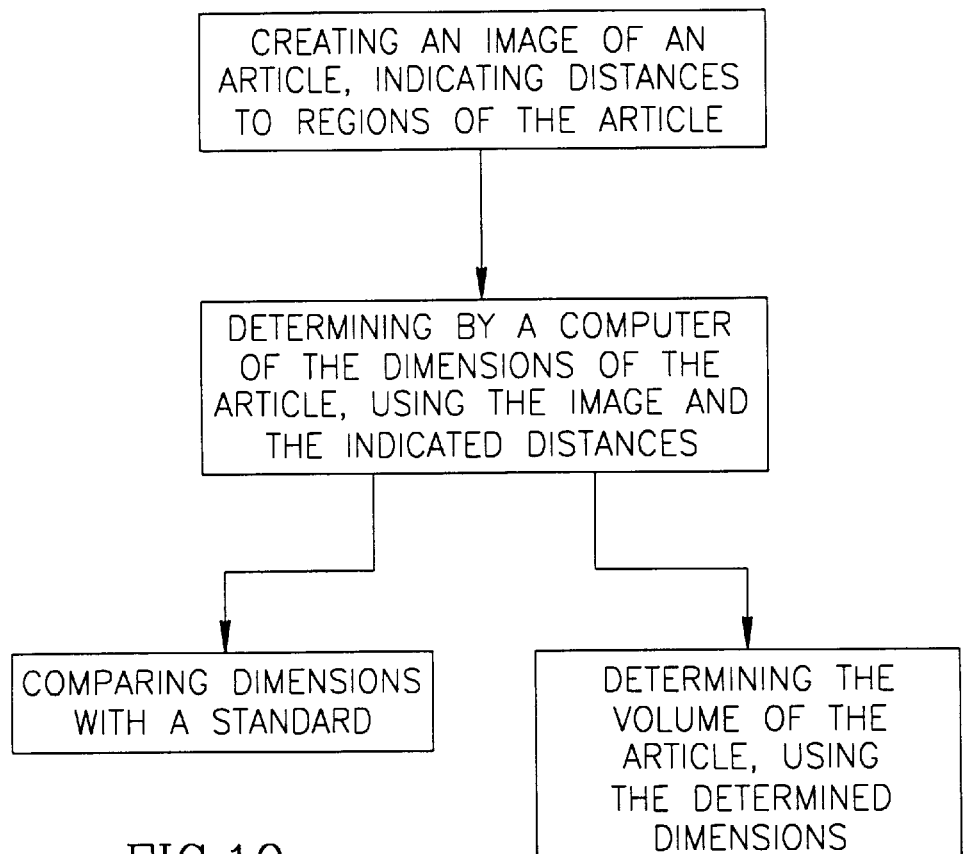

In other preferred embodiments of the present invention, camera 20, 50 or 110 is used in a model scanner, to acquire three-dimensional images of an object of interest. A flow chart outlining these preferred embodiments of the invention is shown on FIG. 19. Preferably, the images are color images. In one such preferred embodiment, these three-dimensional images are used in conjunction with a system for rapid, three-dimensional prototype modeling, as is known in the art, to reproduce one or more three-dimensional copies of or models of the object of interest, including surface color reproduction.

In still other preferred embodiments of the present invention, camera 20, for example, is mounted on a vehicle, for use in a collision avoidance system. Preferably, camera 20 is part of an image analysis system, which identifies possible hazards and uses the camera's output to determine the distance from the vehicle to the hazards.

Figure 20:
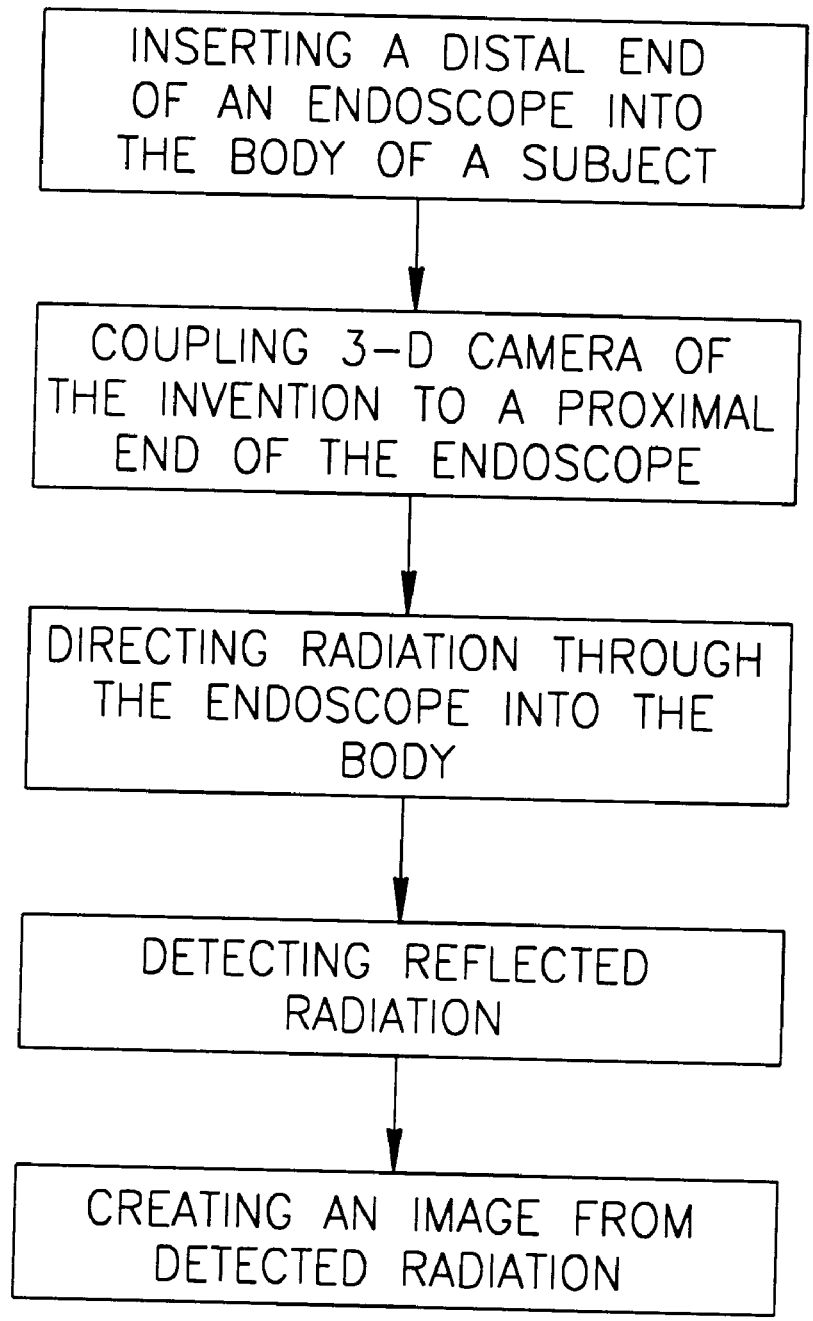

In other preferred embodiments of the present invention, a ranging camera as described above, such as camera 20 or 50, is used in conjunction with an endoscope to acquire three-dimensional images of a region of interest inside a patient's body. A flow chart outlining these preferred embodiments of the invention is shown on FIG. 20.

In another preferred embodiment of the present invention, camera 20 or camera 50 is coupled to a sensory matrix for use a blind person. The sensory matrix may comprise a multiplicity of pins, which are actuated to press against the blind person's skin, for example on his or her forehead, wherein the pressure exerted on the skin by each of the pins is proportional to the distance from the person to an object at a corresponding point in the scene viewed by the camera. Preferably, the blind person controls the camera's distance window, so that the range of pressures exerted by the pins corresponds to a desired distance range from the person.

It will be appreciated that the preferred embodiments described above are cited by way of example, and the full scope of the invention is limited only by the claims.

We claim:

1. Apparatus for creating an image indicating distances to objects in a scene, comprising:

a modulated source of radiation, having a first modulation function, which directs modulated radiation toward a scene such that a portion of the radiation from the source is reflected from points in the scene and reaches the apparatus;

a detector, which detects radiation reflected from the scene, modulated by a second modulation function, and generates, responsive to said detected modulated radiation, signals responsive to a part of the portion of the reflected radiation, the part being dependent on the distance of a point in the scene, associated with a particular signal, from the apparatus;

a processor, which receives signals from the detector and forms an image, based on the signals, having an intensity value distribution indicative of the distance of objects from the apparatus; and a controller, which varies at least one of the first and second modulation functions, responsive to the intensity value distribution of the image formed by the processor.

2. Apparatus according to claim 1, wherein the second modulation function is delayed in time relative to the first modulation function, and the controller varies the time delay.

3. Apparatus according to claim 1, wherein the first and second modulation functions comprise pulses having respective characteristic durations, and the controller varies the duration of at least one of the pulses.

4. Apparatus according to claim 3, wherein the first and second modulation functions comprise pulses having substantially equal characteristic durations, and the controller varies the duration of the pulses in both the first and second modulation functions.

5. Apparatus according to claim 1, and comprising an image analyzer, which identifies an object of interest in the scene, wherein the controller varies the at least one modulation function in response to the distance of the object of interest from the apparatus.

6. Apparatus according to claim 1, and comprising a rangefinder, which determines the distance of an object of interest from the apparatus, wherein the controller varies the at least one modulation function in response to the distance determined by the rangefinder.

7. Apparatus according to claim 1, wherein the controller varies the at least one modulation function, so that the detector detects only radiation reflected from regions of the scene at a distance of interest from the apparatus.

8. Apparatus according to claim 7, and comprising an image processor, which receives a first image, formed by the processor, of the regions of the scene at the distance of interest, and mixes the first image with a second image to produce a mixed image.

9. Apparatus according to claim 1, wherein the detector detects radiation reflected from two objects of interest in the scene, and the controller varies the at least one modulation function so that portions of the image corresponding to the two objects have generally equal intensity values.

10. Apparatus according to claim 1, wherein the detector comprises:
   a detector modulator, which receives radiation reflected from the scene and modulates it in accordance with the second modulation function; and
   a detector array, comprising a plurality of detector elements, which detect radiation modulated by the detector modulator and generate, responsive to said detected modulated radiation, signals responsive to the distance to regions of the scene.

11. Apparatus according to claim 10, wherein the detector modulator comprises a shutter element array, comprising a plurality of shutter elements.

12. Apparatus according to claim 11, wherein the radiation incident on a first detector element is modulated by a first shutter element, and the radiation incident on a second detector element is modulated by a second shutter element, and wherein the second modulation function includes different first and second modulation sub-functions, which are applied to the first and second shutter elements, respectively.

13. Apparatus according to any of the preceding claims, wherein the detector includes a color filter and the image formed by the processor is a color image.

14. Apparatus for creating an image indicating distances to objects in a scene, comprising:
   a modulated source of radiation, having a first modulation function, which directs radiation toward a scene;
   a detector, comprising a detector modulator, having a second modulation function, and a detector array, said array comprising a plurality of detector elements, wherein the detector detects radiation reflected from a plurality of parallel spatial segments within the scene and generates, responsive to said detected radiation, signals responsive to the distance to regions of the scene; and
   a processor, which forms an image including at least some of the plurality of spatial segments and having an intensity value distribution indicative of the distance of objects from the apparatus,
   wherein each of the plurality of spatial segments has distance bounds, relative to the apparatus, which distance bounds are determined by the detector modulator, and
   wherein at least one of the plurality of spatial segments has distance bounds that are different from the bounds of at least one other spatial segment.

15. Apparatus according to claim 14, wherein the detector modulator comprises a shutter array, comprising a plurality of shutter elements.

16. Apparatus according to claim 11 or 15, wherein the shutter element array comprises a liquid crystal array.

17. Apparatus according to claim 11 or 15, wherein the shutter element array comprises a microchannel array.

18. Apparatus according to claim 17, wherein the microchannel array comprises a microchannel plate and a plurality of switchable electrodes adjacent to the plate.

19. Apparatus according to claim 18, wherein the microchannel array comprises a photocathode, and wherein the electrodes comprise conductive, transparent material coated on the photocathode.

20. Apparatus according to claim 19, wherein the conductive, transparent material comprises indium tin oxide.

21. Apparatus according to claim 11 or 15, wherein the shutter element array comprises a linear shutter array.

22. Apparatus according to claim 15, wherein each shutter element is associated with one of the plurality of spatial segments, and wherein the distance bounds of said one of the plurality of spatial segments are determined by the associated shutter element.

23. Apparatus according to claim 15, wherein each of the plurality of shutter elements is associated with a respective group of one or more detector elements.

24. Apparatus according to claim 15, wherein the detector modulator comprises a switching network, which controls the shutter elements according to the second modulation function.

25. Apparatus according to claim 24, wherein application of the second modulation function causes the shutter elements to open and shut sequentially.

26. Apparatus according to claim 24 or 25, wherein the second modulation function comprises a plurality of non-coincident pulses, each of which pulses causes a corresponding shutter element to open and shut.

27. Apparatus according to claim 23, wherein each of the respective groups of one or more detector elements comprises a row of elements of the detector array.

28. Apparatus according to claim 27, wherein each of the respective groups of one or more detector elements comprises a group of mutually-adjacent rows of elements of the detector array.

29. Apparatus according to claim 14, wherein the source of radiation produces a line of illumination on the scene, and wherein the detector receives a corresponding line of reflected radiation.

30. Apparatus according to claim 29, and comprising a scanning device, which scans the line of illumination across the scene.

31. Apparatus according to claim 29 or 30, wherein the detector modulator deflects the line of reflected radiation so as to sequentially dwell for a period of time on each of a plurality of rows of elements of the detector array.

32. Apparatus according to claim 31, wherein each of the plurality of rows of the array is associated with one of the plurality of spatial segments, and wherein the distance bounds of said one of the plurality of spatial segments are determined by the period of time that the line of reflected radiation dwells on the associated row.

33. Apparatus according to claim 31, wherein the period of time that the line of reflected radiation dwells on each of the plurality of rows is determined by the second modulation function.

34. Apparatus according to claim 14, and comprising a controller, which varies at least one of the first and second modulation functions, responsive to the intensity value distribution of the image formed by the processor.

35. Apparatus according to claim 14, wherein the detector includes a color filter.

36. A system for creating an extended image indicating distances to objects in a scene, comprising:

apparatus for creating an image according to claim 14, which forms a plurality of sequential images of the scene, at least one of said plurality of images including one or more regions of the scene not included in at least one other of said images; and an image processor, which combines the plurality of images to form an extended image, indicating distances to objects in the scene.

37. A system according to claim 36, and comprising means for translating the apparatus laterally relative to the scene.

38. A system according to claim 37, wherein the apparatus creates images of the scene in a known relation to a rate of translation of the apparatus relative to the scene.

39. A system according to claim 37 or 38, wherein the means for translating the apparatus comprise a moving platform, to which the apparatus is mounted.

40. A system according to claim 39, wherein the moving platform comprises an aircraft.

41. A system according to claim 36, and comprising scanning optics, which scan the field of view of the apparatus over the scene.

42. Apparatus for creating an image indicating distances to objects in a scene, comprising:

a modulated source of radiation, which directs radiation toward a scene;

telecentric optics, which receive and collimate radiation reflected from the scene;

a modulator, which modulates the collimated radiation;

a detector, which detects an image formed from the modulated collimated radiation; and a processor, which forms an image having an intensity value distribution indicative of the distance of objects from the apparatus, responsive to the intensity distribution of the detected image, wherein the source and the detector are boresighted, and wherein the modulator that modulates the collimated radiation reflected from the scene does not modulate the radiation directed toward the scene by the source.

43. Apparatus for creating an image indicating distances to objects in a scene, comprising:

a modulated source of radiation, having a first modulation function, which directs radiation toward a scene;

a first detector, which detects radiation reflected from the scene, modulated by a second modulation function, and generates, responsive to said detected modulated radiation, signals responsive to the distance to regions of the scene;

a second detector, boresighted with the first detector, which detects radiation reflected from the scene, unmodulated by said second modulation function, and generates, responsive to said detected radiation, signals responsive to the intensity of light reflected from the regions of the scene;

a processor, which receives signals from the first and second detectors and forms an image based on the signals, having an intensity value distribution indicative of the distance of objects from the apparatus.

44. Apparatus according to claim 43, wherein the radiation source is boresighted with the first and second detectors.

45. A method of robot guidance, comprising:

creating an image indicating distances to objects in a scene, utilizing the apparatus of any of claims 1, 14, 42 or 43; and acting upon an object in the scene by a robot, using the distance to the object indicated by the apparatus for guidance.

46. A method for determining dimensions of an article, comprising:

creating an image of the article, indicating distances to regions of the article, utilizing the apparatus of any of claims 1, 14, 42 or 43; and determining, by a computer, of the dimensions of the article, using the image and the indicated distances.

47. A method according to claim 46, wherein the the dimensions are compared with a standard by the computer.

48. A method according to claim 46, and including determining, by the computer the volume of the article, using the determined dimensions.

49. A system for producing a three-dimensional model of an article, comprising:

a system for determining dimensions of the article, according to claim 46; and rapid prototyping apparatus, which receives the dimensions determined by the system for determining dimensions, and produces the three-dimensional model according to the dimensions.

50. A system according to claim 49, wherein the rapid prototyping apparatus receives image information from the apparatus for creating the image of the article and applies the image information to a surface of the three-dimensional model.

51. A system according to claim 50, wherein the image information comprises color information.

52. A system for vehicle guidance, comprising:

apparatus for creating an image indicating distances to objects in a scene ahead of the vehicle in a direction of motion thereof, according to any of claims 1, 14, 42 or 43; and a processor, which identifies hazards in the scene, using the image and the indicated distances.

53. A method of endoscopic imaging, comprising:

inserting a distal end of an endoscope into the body of a subject;

coupling an apparatus according to any of claims 1, 14, 42 or 43 to a proximal end of the endoscope; and creating an image by the apparatus, by directing radiation through the endoscope into the body, and detect radiation reflected therefrom by the apparatus.

54. A method for creating an image indicating distances to objects in a scene, comprising:

modulating radiation from a radiation source according to a first modulation function, and directing said radiation toward a scene;

modulating radiation reflected from the scene according to a second modulation function;

detecting said reflected radiation and generating signals responsive to the distance to regions of the scene, in response to the detected radiation;

forming an image having an intensity value distribution indicative of the distance to objects in the scene; and varying at least one of the first and second modulation functions, responsive to the intensity value distribution of the image.

55. A method according to claim 54, wherein varying at least one of the modulation functions comprises delaying the second modulation function relative to the first.

56. A method according to claim 54, wherein the first and second modulation functions comprise pulses, and varying at least one of the modulation functions comprises varying the duration of at least one of the pulses.

57. A method according to claim 56, wherein the duration of the first modulation function pulse is substantially greater than the duration of the second modulation function pulse.

58. A method according to claim 54, and comprising:
identifying at least one object of interest in the scene; and
determining the distance to the object, using the intensity value distribution of the image.

59. A method according to claim 58, wherein varying at least one of the modulation functions comprises varying the modulation function in response to the distance to the at least one object.

60. A method according to claim 59, wherein varying the modulation function in response to the distance to the at least one object comprises:
defining a range of distances that includes the distance to the at least one object; and
adjusting the modulation function so that detecting reflected radiation comprises detecting radiation from one or more regions of the scene that are within the range of distances.

61. A method according to claim 60, wherein identifying at least one object of interest comprises locating a plurality of points on the at least one object, and wherein defining the range of distances comprises defining a plurality of local ranges, each local range including a respective one of the plurality of points.

62. A method according to claim 60, wherein adjusting the modulation function comprises adjusting the function so that radiation from objects and regions of the scene that are outside the defined range of distances is not detected.

63. A method according to claim 60, wherein adjusting the modulation function comprises adjusting the function so that radiation from objects and regions of the scene that are outside the defined range of distances have a substantially constant intensity value distribution.

64. A method according to claim 60, and comprising forming a first two-dimensional image, said image comprising radiation detected from the one or more regions of the scene that are within the range of distances, and mixing said first two-dimensional image with a second, separately acquired or synthetically generated image, to form a mixed image.

65. A method according to claim 64, and comprising determining the location of a desired zone in the first two-dimensional image, wherein mixing the first two-dimensional image with the second, separately acquired image comprises inserting the second image in the desired zone.

66. A method according to claim 65, wherein inserting the second image in the desired zone comprises scaling the second image to fit in the desired zone.

67. A method according to claim 54, wherein detecting radiation comprises detecting radiation from two objects of interest in the scene, at substantially different respective distances, and
wherein varying at least one of the modulation functions comprises varying the modulation function so that the two objects have generally equal intensity values.

68. A method for creating an image indicating distances to objects in a scene, comprising:
modulating radiation from a radiation source according to a first modulation function, and directing said radiation toward a scene;
defining a plurality of parallel spatial segments within the scene, each said segment having distance bounds;
detecting radiation reflected from each of the parallel spatial segments and generating signals responsive to the distance to regions of the scene, in response to the detected radiation; and
forming an image having an intensity value distribution indicative of the distance to objects in the scene,
wherein defining the plurality of spatial segments comprises defining the distance bounds of each of the plurality of segments, and
wherein the distance bounds of at least one of the plurality of spatial segments are different from the distance bounds of at least one other spatial segment.

69. A method according to claim 68, wherein the distance bounds of a first one of the plurality of spatial segments overlap the distance bounds of a second spatial segment, adjacent thereto.

70. A method according to claim 68, wherein defining a plurality of spatial segments having distance bounds comprises modulating the radiation reflected from each of the segments according to a respective modulation function.

71. A method according to claim 68, wherein detecting radiation comprises accumulating and reading out photoelectric charge produced in response to the radiation, and wherein defining the plurality of spatial segments comprises clearing the photoelectric charge produced in response to the radiation from each of the segments at a respective known, predetermined time interval before accumulating and reading out the charge.

72. A method according to claim 68, wherein directing radiation toward the scene comprises producing a line of radiation and scanning the line across the scene.

73. A method according to claim 68, wherein defining a plurality of spatial segments comprises defining a matrix of mutually adjacent spatial segments, wherein at least one segment within the matrix has different distance bounds from at least one other segment, and
wherein forming an image comprises combining the spatial segments within the matrix to produce an extended segment having distance bounds substantially equal to the union of the respective distance bounds of the segments in the matrix.

74. A method for creating an extended image-indicating distances to objects in a scene, comprising:
creating a first image of a scene, according to claim 68;
scanning the spatial segments laterally, relative to the scene;
creating a second image of the scene, in the same manner as the first image was created; and
registering and combining said first image with said second image, to create the extended image.

75. A method according to claim 54 or 68, wherein forming an image having an intensity value distribution indicative of the distance to objects comprises normalizing said intensity value distribution.

76. A method according to claim 75, wherein normalizing the intensity value distribution comprises correcting the distribution for varying emissivities of the object.

77. A method according to claim 75, wherein normalizing the intensity value distribution comprises correcting the distribution for different object distances.

78. A method according to claim 54 or 68, wherein detecting radiation comprises filtering the radiation according to color, and wherein forming an image comprises forming a color image.

* * * * *